(12) United States Patent
Edlund

(10) Patent No.: US 7,632,322 B2
(45) Date of Patent: Dec. 15, 2009

(54) HYDROGEN-PRODUCING FUEL PROCESSING ASSEMBLIES, HEATING ASSEMBLIES, AND METHODS OF OPERATING THE SAME

(75) Inventor: David J. Edlund, Bend, OR (US)

(73) Assignee: Idatech, LLC, Bend, OR (US)

( * ) Notice: Subject to any disclaimer, the term of this patent is extended or adjusted under 35 U.S.C. 154(b) by 330 days.

(21) Appl. No.: 11/226,810

(22) Filed: Sep. 13, 2005

(65) Prior Publication Data

US 2006/0272212 A1 Dec. 7, 2006

Related U.S. Application Data

(60) Provisional application No. 60/688,430, filed on Jun. 7, 2005.

(51) Int. Cl.
| | |
|---|---|
| *C01B 3/36* | (2006.01) |
| *C10K 3/06* | (2006.01) |
| *B01J 7/00* | (2006.01) |
| *H01M 8/06* | (2006.01) |
| *H01M 8/04* | (2006.01) |
| *H01M 8/18* | (2006.01) |
| *H01M 8/12* | (2006.01) |

(52) U.S. Cl. .................. 48/197 R; 48/61; 48/214 A; 429/17; 429/19; 429/20; 429/22; 429/23; 429/24; 429/25; 422/188; 422/198

(58) Field of Classification Search ............... 48/197 R, 48/61, 214 A; 429/17, 19–20, 22–25; 422/188, 422/198

See application file for complete search history.

(56) References Cited

U.S. PATENT DOCUMENTS 2,824,620 A 2/1958 De Rosset (Continued)

FOREIGN PATENT DOCUMENTS

EP 1065741 A2 1/2001

(Continued)

OTHER PUBLICATIONS

Fig. 1 of Taiwan Patent Publication No. 301473, undated which was cited in a communication received Jul. 21, 2004 from a foreign patent office.

(Continued)

*Primary Examiner*—Walter D Griffin
*Assistant Examiner*—Natasha Young
(74) *Attorney, Agent, or Firm*—Dascenzo Intellectual Property Law, P.C.

(57) ABSTRACT

Combustion-based heating assemblies and hydrogen-producing fuel processing assemblies that include at least a reforming region adapted to be heated by the heating assemblies. The heating assembly may include at least one fuel chamber and at least one heating and ignition source. The at least one fuel chamber may be adapted to receive at least one fuel stream at a first temperature. The fuel stream may include a liquid, combustible, carbon-containing fuel having an ignition temperature greater than the first temperature at which the fuel stream is delivered to the fuel chamber. The at least one heating and ignition source may be adapted to heat at least a portion of the fuel chamber to raise the temperature of at least a portion of the carbon-containing fuel to a second temperature at least as great as the ignition temperature and to ignite the carbon-containing fuel. Methods of use are also disclosed.

31 Claims, 8 Drawing Sheets

U.S. PATENT DOCUMENTS

| | | |
|---|---|---|
| 3,094,391 A | 6/1963 | Mader |
| 3,144,312 A | 8/1964 | Mertens |
| 3,336,730 A | 8/1967 | McBride et al. |
| 3,338,681 A | 8/1967 | Kordesch |
| 3,350,176 A | 10/1967 | Green et al. |
| 3,469,944 A | 9/1969 | Bocard et al. |
| 3,522,019 A | 7/1970 | Buswell et al. |
| 3,655,448 A | 4/1972 | Setzer |
| 3,761,382 A | 9/1973 | Hammond et al. |
| 3,787,038 A | 1/1974 | Tesner et al. |
| 3,920,416 A | 11/1975 | Houseman |
| 3,955,941 A | 5/1976 | Houseman et al. |
| 3,982,910 A | 9/1976 | Houseman et al. |
| 4,033,133 A | 7/1977 | Houseman et al. |
| 4,071,330 A | 1/1978 | Sederquist |
| 4,079,586 A | 3/1978 | Kincaid, Jr. |
| 4,084,934 A | 4/1978 | Kumazawa |
| 4,098,587 A | 7/1978 | Krar et al. |
| 4,098,588 A | 7/1978 | Buswell et al. |
| 4,098,589 A | 7/1978 | Buswell et al. |
| 4,098,959 A | 7/1978 | Fanciullo |
| 4,098,960 A | 7/1978 | Gagnon |
| 4,134,739 A | 1/1979 | Gulden et al. |
| 4,175,165 A | 11/1979 | Adlhart |
| 4,179,879 A | 12/1979 | Kincaid, Jr. |
| 4,203,950 A | 5/1980 | Sederquist |
| 4,214,969 A | 7/1980 | Lawrance |
| 4,238,403 A | 12/1980 | Pinto |
| 4,278,445 A | 7/1981 | Stickler et al. |
| 4,278,446 A | 7/1981 | Von Rosenberg, Jr. et al. |
| 4,292,274 A | 9/1981 | Faitani et al. |
| 4,302,177 A | 11/1981 | Fankhanel et al. |
| 4,331,520 A | 5/1982 | Juda et al. |
| 4,389,326 A | 6/1983 | Tanguy et al. |
| 4,400,182 A | 8/1983 | Davies et al. |
| 4,408,572 A | 10/1983 | Yoon et al. |
| 4,430,304 A | 2/1984 | Spurrier et al. |
| 4,444,158 A | 4/1984 | Yoon |
| 4,468,235 A | 8/1984 | Hill |
| 4,473,622 A | 9/1984 | Chludzinski et al. |
| 4,476,674 A | 10/1984 | Berman |
| 4,504,447 A | 3/1985 | Spurrier et al. |
| 4,506,631 A | 3/1985 | Phong-Anant |
| 4,509,915 A | 4/1985 | Ito |
| 4,533,607 A | 8/1985 | Sederquist |
| 4,562,123 A * | 12/1985 | Shimizu et al. ............... 429/27 |
| 4,567,857 A | 2/1986 | Houseman et al. |
| 4,642,273 A | 2/1987 | Sasaki |
| 4,657,828 A | 4/1987 | Tajima |
| 4,659,634 A | 4/1987 | Struthers |
| 4,687,491 A | 8/1987 | Latty |
| 4,692,306 A | 9/1987 | Minet et al. |
| 4,699,637 A | 10/1987 | Iniotakis et al. |
| 4,788,004 A | 11/1988 | Pinto et al. |
| 4,820,594 A | 4/1989 | Sugita et al. |
| 4,838,897 A | 6/1989 | Amano et al. |
| 4,849,187 A | 7/1989 | Uozu et al. |
| 4,981,676 A | 1/1991 | Minet et al. |
| 4,988,286 A | 1/1991 | Hersh |
| 5,198,312 A | 3/1993 | Irino et al. |
| 5,226,928 A | 7/1993 | Makabe et al. |
| 5,229,102 A | 7/1993 | Minet et al. |
| 5,401,589 A | 3/1995 | Palmer et al. |
| RE35,002 E | 7/1995 | Matsubara et al. |
| 5,432,710 A | 7/1995 | Ishimaru et al. |
| 5,458,857 A | 10/1995 | Collins et al. |
| 5,470,360 A | 11/1995 | Sederquist |
| 5,516,344 A | 5/1996 | Corrigan |
| 5,616,430 A | 4/1997 | Aoyama |
| 5,628,931 A | 5/1997 | Lednor et al. |
| 5,637,414 A | 6/1997 | Inoue et al. |
| 5,639,431 A | 6/1997 | Shirasaki et al. |
| 5,714,276 A | 2/1998 | Okamoto |
| 5,729,967 A | 3/1998 | Joos et al. |
| 5,744,067 A | 4/1998 | Jahnke |
| 5,780,179 A | 7/1998 | Okamoto |
| 5,798,186 A | 8/1998 | Fletcher et al. |
| 5,811,065 A | 9/1998 | Sterenberg |
| 5,833,723 A | 11/1998 | Kuwabara et al. |
| 5,851,689 A | 12/1998 | Chen |
| 5,861,137 A | 1/1999 | Edlund |
| 5,932,141 A | 8/1999 | Rostrop-Nielsen et al. |
| 5,938,800 A | 8/1999 | Verrill et al. |
| 5,997,594 A | 12/1999 | Edlund et al. |
| 5,998,053 A | 12/1999 | Diethelm |
| 6,042,956 A | 3/2000 | Lenel |
| 6,045,772 A | 4/2000 | Szydlowski et al. |
| 6,045,933 A | 4/2000 | Okamoto |
| 6,077,620 A | 6/2000 | Pettit |
| 6,083,637 A | 7/2000 | Walz et al. |
| 6,103,411 A | 8/2000 | Matsubayashi et al. |
| 6,123,873 A | 9/2000 | Primdahl |
| 6,124,053 A | 9/2000 | Bernard et al. |
| 6,152,995 A | 11/2000 | Edlund |
| 6,165,633 A | 12/2000 | Negishi |
| 6,180,272 B1 | 1/2001 | Byrne et al. |
| 6,183,895 B1 | 2/2001 | Kudo et al. |
| 6,187,066 B1 | 2/2001 | Benz et al. |
| 6,190,623 B1 | 2/2001 | Sanger et al. |
| 6,201,029 B1 | 3/2001 | Waycuilis |
| 6,221,117 B1 | 4/2001 | Edlund et al. |
| 6,242,120 B1 | 6/2001 | Herron |
| 6,274,258 B1 | 8/2001 | Chen |
| 6,296,814 B1 | 10/2001 | Bonk et al. |
| 6,319,306 B1 | 11/2001 | Edlund et al. |
| 6,328,945 B1 | 12/2001 | Hufton et al. |
| 6,365,290 B1 | 4/2002 | Ghezel-Ayagh et al. |
| 6,375,906 B1 | 4/2002 | Edlund et al. |
| 6,376,113 B1 | 4/2002 | Edlund et al. |
| 6,383,670 B1 | 5/2002 | Edlund et al. |
| 6,419,728 B1 | 7/2002 | Edlund |
| 6,451,464 B1 | 9/2002 | Edlund et al. |
| 6,458,189 B1 | 10/2002 | Edlund et al. |
| 6,461,408 B2 | 10/2002 | Buxbaum |
| 6,465,118 B1 | 10/2002 | Dickman et al. |
| 6,472,092 B1 | 10/2002 | Matsuda et al. |
| 6,494,937 B1 | 12/2002 | Edlund et al. |
| 6,495,277 B1 | 12/2002 | Edlund et al. |
| 6,521,204 B1 | 2/2003 | Borup et al. |
| 6,537,352 B2 | 3/2003 | Edlund et al. |
| 6,562,111 B2 | 5/2003 | Edlund et al. |
| 6,608,463 B1 | 8/2003 | Kelly et al. |
| 6,609,582 B1 | 8/2003 | Botti et al. |
| 6,632,270 B2 | 10/2003 | Edlund et al. |
| 6,669,463 B2 | 12/2003 | Beutel et al. |
| 6,692,853 B2 | 2/2004 | Hanai et al. |
| 6,719,831 B2 | 4/2004 | Edlund et al. |
| 6,723,156 B2 | 4/2004 | Edlund et al. |
| 6,805,553 B2 | 10/2004 | Hermann et al. |
| 6,824,593 B2 | 11/2004 | Edlund et al. |
| 6,869,456 B2 | 3/2005 | Salemi et al. |
| 6,869,707 B2 | 3/2005 | Edlund et al. |
| 2002/0108309 A1 | 8/2002 | Grieve et al. |
| 2002/0110507 A1 | 8/2002 | Grieve et al. |
| 2002/0119353 A1 * | 8/2002 | Edlund et al. ............... 429/19 |
| 2002/0124836 A1 | 9/2002 | Reddy |
| 2003/0008186 A1 * | 1/2003 | Dickman et al. ............ 429/19 |
| 2003/0039871 A1 | 2/2003 | Christen et al. |
| 2003/0082419 A1 | 5/2003 | Berlowitz et al. |
| 2003/0200699 A1 | 10/2003 | Robb |
| 2003/0223926 A1 | 12/2003 | Edlund et al. |
| 2003/0234123 A1 | 12/2003 | Schumann et al. |
| 2004/0105795 A1 | 6/2004 | Gough |
| 2004/0121202 A1 | 6/2004 | Varadaraj et al. |

| | | | |
|---|---|---|---|
| 2004/0121203 | A1 | 6/2004 | Varadaraj et al. |
| 2004/0126643 | A1 | 7/2004 | Kinkelaar et al. |
| 2004/0155065 | A1 | 8/2004 | Kinkelaar et al. |
| 2005/0008909 | A1 | 1/2005 | Kaye et al. |
| 2005/0019623 | A1 | 1/2005 | Shoji et al. |

FOREIGN PATENT DOCUMENTS

| | | |
|---|---|---|
| JP | 57-145276 | 9/1982 |
| JP | 4-338101 | 11/1992 |
| WO | WO 99/65097 | 12/1999 |

OTHER PUBLICATIONS

Emonts, B., et al., "Compact Methanol Reformer Test for Fuel-Cell Powered Light-Duty Vehicles," Fifth Grove Fuel Cell Symposium, Commonwealth Institute, London, U.K., p. 42 (Sep. 22-25, 1997).
English-language abstract of Great Britain Patent No. 2,305,186, 1997.
English-language abstract of Japanese Patent No. 8287932, 1996.
English-language abstract of Japanese Patent No. 710910, 1995.
English-language abstract of Japanese Patent No. 5132301, 1993.
English-language abstract of Japanese Patent No. 5147902, 1993.
English-language abstract of Japanese Patent No. 4-338101, 1992.

* cited by examiner

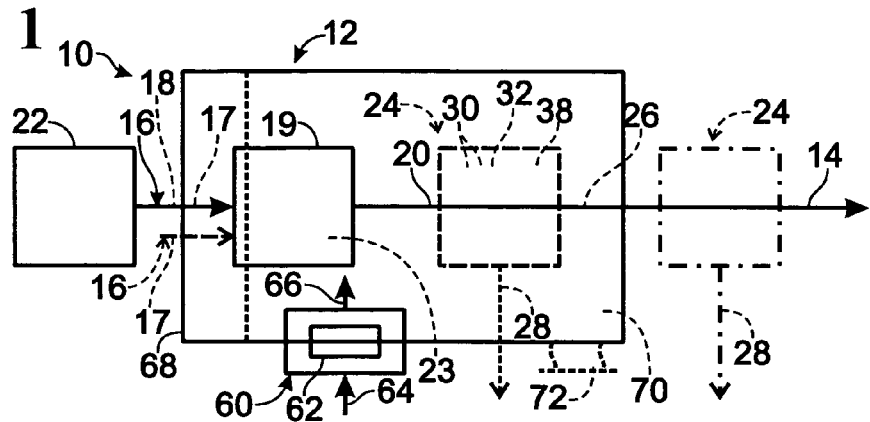
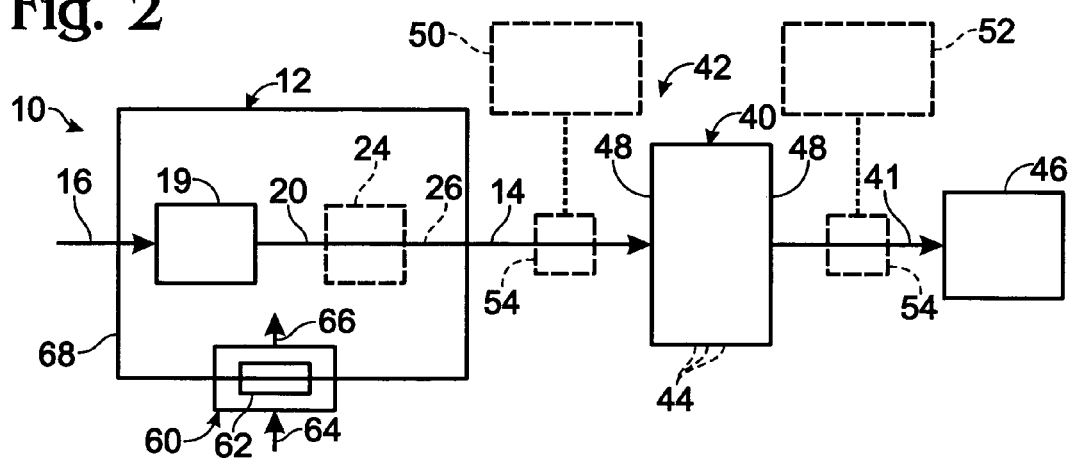
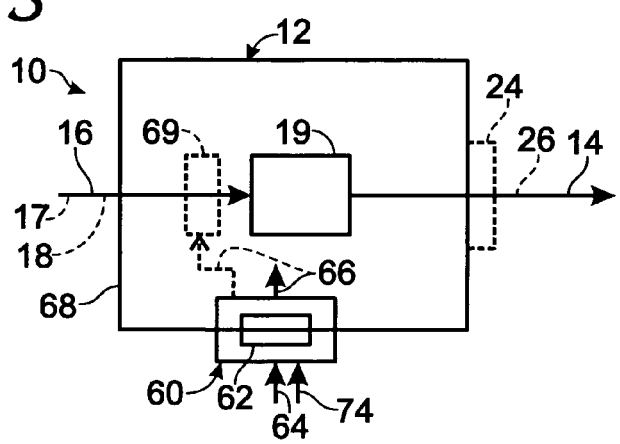

HYDROGEN-PRODUCING FUEL PROCESSING ASSEMBLIES, HEATING ASSEMBLIES, AND METHODS OF OPERATING THE SAME

RELATED APPLICATION

The present application claims priority to similarly entitled U.S. Provisional Patent Application Ser. No. 60/688,430, which was filed on Jun. 7, 2005 and the complete disclosure of which is hereby incorporated by reference for all purposes.

FIELD OF THE DISCLOSURE

The present disclosure is directed generally to hydrogen-producing fuel processing systems, and more particularly, to combustion-based heating assemblies for use in such fuel processing systems.

BACKGROUND OF THE DISCLOSURE

Purified hydrogen is used in the manufacture of many products including metals, edible fats and oils, and semiconductors and microelectronics. Purified hydrogen is also an important fuel source for many energy conversion devices. For example, many fuel cells use purified hydrogen and an oxidant to produce an electrical potential. A series of interconnected fuel cells is referred to as a fuel cell stack, and this stack may be referred to as a fuel cell system when combined with sources of oxidant and hydrogen gas. Various processes and devices may be used to produce the hydrogen gas that is consumed by the fuel cells.

As used herein, a fuel processing assembly is a device or combination of devices that produces hydrogen gas from one or more feed streams that include one or more feedstocks. Examples of fuel processing assemblies include steam and autothermal reformers, in which the feed stream contains water and a carbon-containing feedstock, such as an alcohol or a hydrocarbon, and partial oxidation and pyrolysis reactors, in which the feed stream is a carbon-containing feedstock. Fuel processors typically operate at elevated temperatures. In endothermic fuel processing reactions, such as in steam reforming fuel processing assemblies, the heat required to heat the fuel processing assembly needs to be provided by a heating assembly, such as a burner, electrical heater or the like. When burners are used to heat the fuel processor, the burners typically utilize a combustible fuel stream, such as a combustible gas or a combustible liquid.

One such hydrogen-producing fuel processing assembly includes a steam reformer, in which hydrogen gas is produced from a feed stream that includes a carbon-containing feedstock and water. Steam reforming is performed at elevated temperatures and pressures, and a steam reformer typically includes a heating assembly that provides heat for the steam reforming reaction. Illustrative but not exclusive uses of the heat include maintaining the reforming catalyst bed at a selected reforming temperature, or temperature range, and vaporizing a liquid feed stream prior to its use to produce hydrogen gas. One type of heating assembly is a burner, in which a combustible fuel stream is combusted with air. Additionally, steam reforming fuel processing assemblies conventionally utilize a fuel stream that has a different composition than the feed stream and which is delivered to, and consumed by, the burner or other heating assembly to heat the steam reformer and/or the feed stream.

BRIEF DESCRIPTION OF THE DRAWINGS

FIG. 1 is a schematic diagram of a fuel processing assembly with a heating assembly according to the present disclosure.

FIG. 2 is a schematic diagram of a fuel cell system with a heating assembly according to the present disclosure.

FIG. 3 is a schematic diagram of another fuel processing assembly with a heating assembly according to the present disclosure.

DETAILED DESCRIPTION AND BEST MODE OF THE DISCLOSURE

Figure 4:
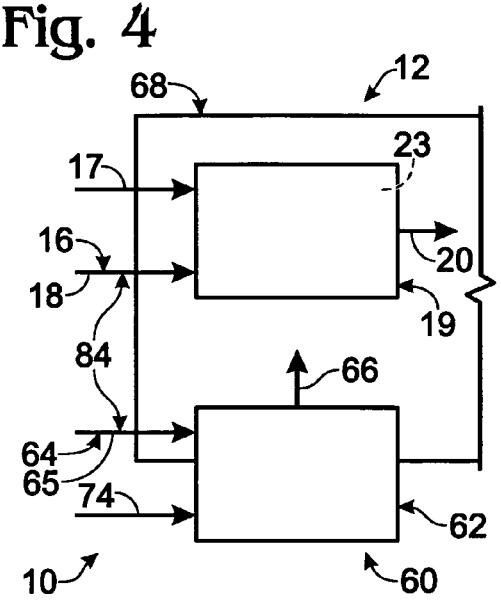
FIG. 4 is a schematic view of a fuel processing assembly according to the present disclosure in which the hydrogen-producing region and the heating assembly both receive the same liquid carbon-containing feedstock.

The present disclosure is directed to hydrogen-producing fuel processing assemblies, such as may be used in fuel cell systems, and more particularly, to fuel processing assemblies that include heating assemblies adapted to receive and combust a liquid fuel stream to heat at least the hydrogen-producing region of the fuel processing assembly. The hydrogen-producing region includes a suitable catalyst to utilize a steam reforming, or other endothermic, reaction to produce hydrogen gas. The hydrogen-producing region is adapted to receive at least one feed stream, which individually or collectively comprise a carbon-containing feedstock and water, to produce an output stream comprising hydrogen gas as a majority component. The fuel processing assembly is in thermal communication with a combustion-based heating assembly that is adapted to receive, ignite and combust a fuel stream to produce a heated combustion stream for heating at least the hydrogen-producing region. The heating assembly may include at least one fuel chamber and at least one heating and ignition source. In some embodiments, the fuel chamber may be adapted to receive at least one fuel stream comprising liquid, combustible, carbon-containing fuel, and may be adapted to receive a predetermined volume of combustible, carbon-containing fuel via the at least one fuel stream. In some embodiments, the fuel includes methanol or another alcohol, and in some embodiments the fuel further includes water. In some embodiments, the feed stream and the fuel stream each comprise at least one common carbon-containing component, and in some embodiments the feed stream and the fuel stream have the same composition and/or are drawn from a common source. In some embodiments, the fuel chamber may include a liquid fuel region and a fuel vapor region. The at least one heating and ignition source may be disposed at least partially in the fuel vapor region. In some embodiments, the heating and ignition source may be disposed between the liquid fuel region and the reforming region. Additionally or alternatively, the fuel chamber may include an at least substantially open reservoir, which, in some embodiments, may include a transport medium adapted to promote delivery of the liquid fuel to the fuel vapor region.

The fuel stream may enter the fuel chamber at a first temperature and may have an ignition temperature greater than the first temperature. In some embodiments, the carbon-containing fuel delivered to the fuel chamber may have an ignition partial pressure, and the carbon-containing fuel in the fuel chamber may have an initial partial pressure less than its ignition partial pressure. As used herein, "ignition temperature" refers to the minimum temperature at which ignition of the fuel stream will occur in the presence of sufficient air to support combustion. As used herein, "ignition vapor pressure" refers to the minimum vapor pressure at which ignition of the fuel stream in air will occur.

In some embodiments, the at least one heating and ignition source may be adapted to heat at least a portion of the fuel chamber to raise the temperature of at least a portion of the carbon-containing fuel to a second temperature that is at least as great as the ignition temperature and to ignite the carbon-containing fuel. Additionally or alternatively, the heating and ignition source may be adapted to heat at least a portion of the fuel chamber to raise the partial pressure of the carbon-containing fuel in at least a portion of the fuel vapor region of the fuel chamber to a second partial pressure at least as great as the ignition partial pressure and may be adapted to ignite at least a portion of the fuel. In some embodiments, the at least one heating and ignition source may comprise an electrical resistance heating element adapted to be heated to a heating element ignition temperature at which the heating element is adapted to ignite the carbon-containing fuel in the fuel chamber.

A fuel processing assembly is shown in FIG. 1 and is indicated generally at 10. Fuel processing assembly 10 includes a fuel processor 12 that is adapted to produce a product hydrogen stream 14 containing hydrogen gas, and preferably at least substantially pure hydrogen gas, from one or more feed streams 16. Feed stream 16 may include at least one carbon-containing feedstock 18. Fuel processor 12 is any suitable device, or combination of devices, that is adapted to produce hydrogen gas from feed stream(s) 16. Accordingly, fuel processor 12 includes a hydrogen-producing region 19, in which an output stream 20 containing hydrogen gas is produced by utilizing any suitable hydrogen-producing mechanism(s). Output stream 20 includes hydrogen gas as at least a majority component. Output stream 20 may include one or more additional gaseous components, and thereby may be referred to as a mixed gas stream that contains hydrogen gas as its majority component.

Examples of suitable mechanisms for producing hydrogen gas from feed stream(s) 16 include steam reforming and autothermal reforming, in which reforming catalysts are used to produce hydrogen gas from a feed stream 16 containing a carbon-containing feedstock 18 and water 17. Other suitable mechanisms for producing hydrogen gas include pyrolysis and catalytic partial oxidation of a carbon-containing feedstock, in which case the feed stream does not contain water. Still another suitable mechanism for producing hydrogen gas is electrolysis, in which case the feedstock is water. Examples of suitable carbon-containing feedstocks 18 include at least one hydrocarbon or alcohol. Examples of suitable hydrocarbons include methane, propane, natural gas, diesel, kerosene, gasoline and the like. Examples of suitable alcohols include methanol, ethanol, and polyols, such as ethylene glycol and propylene glycol.

Feed stream(s) 16 may be delivered to fuel processor 12 via any suitable mechanism. While a single feed stream 16 is shown in FIG. 1, it is within the scope of the disclosure that more than one stream 16 may be used and that these streams may contain the same or different feedstocks. This is schematically illustrated by the inclusion of a second feed stream 16 in dashed lines in FIG. 1. When feed stream 16 contains two or more components, such as a carbon-containing feedstock and water, the components may be delivered in the same or different feed streams. For example, when the fuel processor is adapted to produce hydrogen gas from a carbon-containing feedstock and water, these components are typically delivered in separate streams, and optionally (at least until both streams are vaporized or otherwise gaseous), when they are not miscible with each other, such as shown in FIG. 1 by reference numerals 17 and 18 pointing to different feed streams. When the carbon-containing feedstock is miscible with water, the feedstock is typically, but is not required to be, delivered with the water component of feed stream 16, such as shown in FIG. 1 by reference numerals 17 and 18 pointing to the same feed stream 16. For example, when the fuel processor receives a feed stream containing water and a water-soluble alcohol, such as methanol, these components may be premixed and delivered as a single stream.

In FIG. 1, feed stream 16 is shown being delivered to fuel processor 12 by a feedstock delivery system 22, which schematically represents any suitable mechanism, device or combination thereof for selectively delivering the feed stream to the fuel processor. For example, the delivery system may include one or more pumps that are adapted to deliver the components of stream 16 from one or more supplies. Additionally, or alternatively, feedstock delivery system 22 may include a valve assembly adapted to regulate the flow of the components from a pressurized supply. The supplies may be located external of the fuel processing assembly, or may be contained within or adjacent the assembly. When feed stream 16 is delivered to the fuel processor in more than one stream, the streams may be delivered by the same or separate feedstock delivery systems.

Steam reforming is one example of a hydrogen-producing mechanism that may be employed in hydrogen-producing region 19 in which feed stream 16 comprises water and a carbon-containing feedstock. In a steam reforming process, hydrogen-producing region 19 contains a suitable steam reforming catalyst 23, as indicated in dashed lines in FIG. 1. In such an embodiment, the fuel processor may be referred to as a steam reformer, hydrogen-producing region 19 may be referred to as a reforming region, and output, or mixed gas, stream 20 may be referred to as a reformate stream. As used herein, reforming region 19 refers to any hydrogen-producing region utilizing a steam reforming hydrogen-producing mechanism. Examples of suitable steam reforming catalysts include copper-zinc formulations of low temperature shift catalysts and a chromium formulation sold under the trade name KMA by Süd-Chemie, although others may be used. The other gases that are typically present in the reformate stream include carbon monoxide, carbon dioxide, methane, steam, and/or unreacted carbon-containing feedstock.

As an illustrative example of temperatures that may be achieved and/or maintained in hydrogen-producing region 19 through the use of heating assembly 60, hydrogen-producing steam reformers typically operate at temperatures in the range of 200° C. and 900° C. Temperatures outside of this range are within the scope of the disclosure. When the carbon-containing feedstock is methanol, the steam reforming reaction will typically operate in a temperature range of approximately 200-500° C. Illustrative subsets of this range include 350-450° C., 375-425° C., and 375-400° C. When the carbon-containing feedstock is a hydrocarbon, ethanol, or a similar alcohol, a temperature range of approximately 400-900° C. will typically be used for the steam reforming reaction. Illustrative subsets of this range include 750-850° C., 725-825° C., 650-750° C., 700-800° C., 700-900° C., 500-800° C., 400-600° C., and 600-800° C. It is within the scope of the present disclosure for the hydrogen-producing region to include two or more zones, or portions, each of which may be operated at the same or at different temperatures. For example, when the hydrogen-production fluid includes a hydrocarbon, in some embodiments it may be desirable to include two different hydrogen-producing portions, with one operating at a lower temperature than the other to provide a pre-reforming region. In such an embodiment, the fuel processing system may alternatively be described as including two or more hydrogen producing regions.

In many applications, it is desirable for the fuel processor to produce at least substantially pure hydrogen gas. Accordingly, the fuel processor may utilize a process that inherently produces sufficiently pure hydrogen gas. When the output stream contains sufficiently pure hydrogen gas and/or sufficiently low concentrations of one or more non-hydrogen components for a particular application, product hydrogen stream 14 may be formed directly from output stream 20. However, in many hydrogen-producing processes, output stream 20 will be a mixed gas stream that contains hydrogen gas as a majority component along with other gases. Similarly, in many applications, the output stream 20 may be substantially pure hydrogen but still contain concentrations of one or more non-hydrogen components that are harmful or otherwise undesirable in the application for which the product hydrogen stream is intended to be used.

Fuel processing assembly 10 may (but is not required to) further include a purification region 24, in which a hydrogen-rich stream 26 is produced from the output, or mixed gas, stream. Hydrogen-rich stream 26 contains at least one of a greater hydrogen concentration than output stream 20 and a reduced concentration of one or more of the other gases or impurities that were present in the output stream. Purification region 24 is schematically illustrated in FIG. 1, where output stream 20 is shown being delivered to an optional purification region 24. As shown in FIG. 1, at least a portion of hydrogen-rich stream 26 forms product hydrogen stream 14. Accordingly, hydrogen-rich stream 26 and product hydrogen stream 14 may be the same stream and have the same compositions and flow rates. However, it is also within the scope of the present disclosure that some of the purified hydrogen gas in hydrogen-rich stream 26 may be stored for later use, such as in a suitable hydrogen storage assembly, and/or consumed by the fuel processing assembly.

Purification region 24 may, but is not required to, produce at least one byproduct stream 28. When present, byproduct stream 28 may be exhausted, sent to a burner assembly or other combustion source, used as a heated fluid stream, stored for later use, or otherwise utilized, stored or disposed of. It is within the scope of the disclosure that byproduct stream 28 may be emitted from the purification region as a continuous stream responsive to the delivery of output stream 20 to the purification region, or intermittently, such as in a batch process or when the byproduct portion of the output stream is retained at least temporarily in the purification region.

Purification region 24 includes any suitable device, or combination of devices, that are adapted to reduce the concentration of at least one component of output stream 20. In most applications, hydrogen-rich stream 26 will have a greater hydrogen concentration than output, or mixed gas, stream 20. However, it is also within the scope of the disclosure that the hydrogen-rich stream will have a reduced concentration of one or more non-hydrogen components that were present in output stream 20, yet have the same, or even a reduced overall hydrogen concentration as the output stream. For example, in some applications where product hydrogen stream 14 may be used, certain impurities, or non-hydrogen components, are more harmful than others. As a specific example, in conventional fuel cell systems, carbon monoxide may damage a fuel cell stack if it is present in even a few parts per million, while other non-hydrogen components that may be present in stream 20, such as water, will not damage the stack even if present in much greater concentrations. Therefore, in such an application, a suitable purification region may not increase the overall hydrogen concentration, but it will reduce the concentration of a non-hydrogen component that is harmful, or potentially harmful, to the desired application for the product hydrogen stream.

Illustrative examples of suitable devices for purification region 24 include one or more hydrogen-selective membranes 30, chemical carbon monoxide removal assemblies 32, and pressure swing adsorption systems 38. It is within the scope of the disclosure that purification region 24 may include more than one type of purification device, and that these devices may have the same or different structures and/or operate by the same or different mechanisms.

Hydrogen-selective membranes 30 are permeable to hydrogen gas, but are at least substantially, if not completely, impermeable to other components of output stream 20. Membranes 30 may be formed of any hydrogen-permeable material suitable for use in the operating environment and parameters in which purification region 24 is operated. Examples of suitable materials for membranes 30 include palladium and palladium alloys, and especially thin films of such metals and metal alloys. Palladium alloys have proven particularly effective, especially palladium with 35 wt % to 45 wt % copper. A palladium-copper alloy that contains approximately 40 wt % copper has proven particularly effective, although other relative concentrations and components may be used within the scope of the disclosure.

Hydrogen-selective membranes are typically formed from a thin foil that is approximately 0.001 inches thick. It is within the scope of the present disclosure, however, that the membranes may be formed from other hydrogen-permeable and/or hydrogen-selective materials, including metals and metal alloys other than those discussed above as well as non-metallic materials and compositions, and that the membranes may have thicknesses that are greater or less than discussed above. For example, the membrane may be made thinner, with commensurate increase in hydrogen flux. Examples of suitable mechanisms for reducing the thickness of the membranes include rolling, sputtering and etching. A suitable etching process is disclosed in U.S. Pat. No. 6,152,995, the complete disclosure of which is hereby incorporated by reference for all purposes. Examples of various membranes, membrane configurations, and methods for preparing the same are disclosed in U.S. Pat. Nos. 6,221,117, 6,319,306, and 6,537,352, the complete disclosures of which are hereby incorporated by reference for all purposes.

Chemical carbon monoxide removal assemblies 32 are devices that chemically react carbon monoxide and/or other undesirable components of stream 20, if present in output stream 20, to form other compositions that are not as potentially harmful. Examples of chemical carbon monoxide removal assemblies include water-gas shift reactors and other devices that convert carbon monoxide to carbon dioxide, and methanation catalyst beds that convert carbon monoxide and hydrogen to methane and water. It is within the scope of the disclosure that fuel processing assembly 10 may include more than one type and/or number of chemical removal assemblies 32.

Pressure swing adsorption (PSA) is a chemical process in which gaseous impurities are removed from output stream 20 based on the principle that certain gases, under the proper conditions of temperature and pressure, will be adsorbed onto an adsorbent material more strongly than other gases. Typically, it is the impurities that are adsorbed and removed from output stream 20. The success of using PSA for hydrogen purification is due to the relatively strong adsorption of common impurity gases (such as CO, $CO_2$, hydrocarbons including $CH_4$, and $N_2$) on the adsorbent material. Hydrogen adsorbs only very weakly and so hydrogen passes through the adsorbent bed while the impurities are retained on the adsorbent material. Impurity gases such as $NH_3$, $H_2S$, and $H_2O$ adsorb very strongly on the adsorbent material and are removed from stream 20 along with other impurities. If the adsorbent material is going to be regenerated and these impurities are present in stream 20, purification region 24 preferably includes a suitable device that is adapted to remove these impurities prior to delivery of stream 20 to the adsorbent material because it is more difficult to desorb these impurities.

Adsorption of impurity gases occurs at elevated pressure. When the pressure is reduced, the impurities are desorbed from the adsorbent material, thus regenerating the adsorbent material. Typically, PSA is a cyclic process and requires at least two beds for continuous (as opposed to batch) operation. Examples of suitable adsorbent materials that may be used in adsorbent beds are activated carbon and zeolites, especially 5 Å (5 angstrom) zeolites. The adsorbent material is commonly in the form of pellets and it is placed in a cylindrical pressure vessel utilizing a conventional packed-bed configuration. Other suitable adsorbent material compositions, forms, and configurations may be used.

PSA system 38 also provides an example of a device for use in purification region 24 in which the byproducts, or removed components, are not directly exhausted from the region as a gas stream concurrently with the purification of the output stream. Instead, these byproduct components are removed when the adsorbent material is regenerated or otherwise removed from the purification region.

In FIG. 1, purification region 24 is shown within fuel processor 12. It is within the scope of the disclosure that region 24, when present, may alternatively be separately located downstream from the fuel processor, as is schematically illustrated in dash-dot lines in FIG. 1. It is also within the scope of the disclosure that purification region 24 may include portions within and external fuel processor 12.

In the context of a fuel processor, or fuel processing assembly, that is adapted to produce a product hydrogen stream that will be used as a feed, or fuel, stream for a fuel cell stack, the fuel processor preferably is adapted to produce substantially pure hydrogen gas, and even more preferably, the fuel processor is adapted to produce pure hydrogen gas. For the purposes of the present disclosure, substantially pure hydrogen gas is greater than 90% pure, preferably greater than 95% pure, more preferably greater than 99% pure, and even more preferably greater than 99.5% pure. Suitable fuel processors for producing streams of at least substantially pure hydrogen gas are disclosed in U.S. Pat. Nos. 6,319,306, 6,221,117, 5,997,594, 5,861,137, pending U.S. patent application Ser. No. 09/802,361, which was filed on Mar. 8, 2001 and is entitled "Fuel Processor and Systems and Devices Containing the Same," and U.S. patent application Ser. No. 10/407,500, which was filed on Apr. 4, 2003, is entitled "Steam Reforming Fuel Processor," and which claims priority to U.S. Provisional Patent Application Ser. No. 60/372,258. The complete disclosures of the above-identified patents and patent applications are hereby incorporated by reference for all purposes.

Product hydrogen stream 14 may be used in a variety of applications, including applications where high purity hydrogen gas is utilized. An example of such an application is as a fuel, or feed, stream for a fuel cell stack. A fuel cell stack is a device that produces an electrical potential from a source of protons, such as hydrogen gas, and an oxidant, such as oxygen gas. Accordingly, a fuel cell stack may be adapted to receive at least a portion of product hydrogen stream 14 and a stream of oxygen (which is typically delivered as an air stream), and to produce an electric current therefrom. This is schematically illustrated in FIG. 2, in which a fuel cell stack is indicated at 40 and produces an electric current, which is schematically illustrated at 41. In such a configuration, in which the fuel processor or fuel processing assembly is coupled to a fuel cell stack, the resulting system may be referred to as a fuel cell system 42 because it includes a fuel cell stack and a source of fuel for the fuel cell stack. It is within the scope of the present disclosure that fuel processors and heating assemblies according to the present disclosure may be used in applications that do not include a fuel cell stack.

When stream 14 is intended for use in a fuel cell stack, compositions that may damage the fuel cell stack, such as carbon monoxide and carbon dioxide, may be removed from the hydrogen-rich stream, if necessary, such as by purification region 24. For fuel cell stacks, such as proton exchange membrane (PEM) and alkaline fuel cell stacks, the concentration of carbon monoxide is preferably less than 10 ppm (parts per million). Preferably, the concentration of carbon monoxide is less than 5 ppm, and even more preferably, less than 1 ppm. The concentration of carbon dioxide may be greater than that of carbon monoxide. For example, concentrations of less than 25% carbon dioxide may be acceptable in some embodiments. Preferably, the concentration is less than 10%, and even more preferably, less than 1%. While not required, especially preferred concentrations are less than 50 ppm. The acceptable minimum concentrations presented herein are illustrative examples, and concentrations other than those presented herein may be used and are within the scope of the present disclosure. For example, particular users or manufacturers may require minimum or maximum concentration levels or ranges that are different than those identified herein.

Fuel cell stack 40 contains at least one, and typically multiple, fuel cells 44 that are adapted to produce an electric current from an oxidant, such as air, oxygen-enriched air, or oxygen gas, and the portion of the product hydrogen stream 14 delivered thereto. A fuel cell stack typically includes multiple fuel cells joined together between common end plates 48, which contain fluid delivery/removal conduits, although this construction is not required to all embodiments. Examples of suitable fuel cells include proton exchange membrane (PEM) fuel cells and alkaline fuel cells. Others include solid oxide fuel cells, phosphoric acid fuel cells, and molten carbonate fuel cells.

The electric current produced by stack 40 may be used to satisfy the energy demands, or applied load, of at least one associated energy-consuming device 46. Illustrative examples of devices 46 include, but should not be limited to, motor vehicles, recreational vehicles, construction or industrial vehicles, boats or other seacraft, tools, lights or lighting assemblies, appliances (such as household or other appliances), households or other dwellings, offices or other commercial establishments, computers, signaling or communication equipment, etc. Similarly, fuel cell stack 40 may be used to satisfy the power requirements of fuel cell system 42, which may be referred to as the balance-of-plant power requirements of the fuel cell system. It should be understood that device 46 is schematically illustrated in FIG. 2 and is meant to represent one or more devices, or collection of devices, that are adapted to draw electric current from the fuel cell system.

Fuel cell stack 40 may receive all of product hydrogen stream 14. Some or all of stream 14 may additionally, or alternatively, be delivered, via a suitable conduit, for use in another hydrogen-consuming process, burned for fuel or heat, or stored for later use. As an illustrative example, a hydrogen storage device 50 is shown in dashed lines in FIG. 2. Device 50 is adapted to store at least a portion of product hydrogen stream 14. For example, when the demand for hydrogen gas by stack 40 is less than the hydrogen output of fuel processor 12, the excess hydrogen gas may be stored in device 50. Illustrative examples of suitable hydrogen storage devices include hydride beds and pressurized tanks. Although not required, a benefit of fuel processing assembly 10 or fuel cell system 42 including a supply of stored hydrogen is that this supply may be used to satisfy the hydrogen requirements of stack 40, or the other application for which stream 14 is used, in situations when fuel processor 12 is not able to meet these hydrogen demands. Examples of these situations include when the fuel processor is starting up from a cold, or inactive state, ramping up (being heated and/or pressurized) from an idle state, offline for maintenance or repair, and when the fuel cell stack or application is demanding a greater flow rate of hydrogen gas than the maximum available production from the fuel processor. Additionally or alternatively, the stored hydrogen may also be used as a combustible fuel stream to heat the fuel processing assembly or fuel cell system. Fuel processing assemblies that are not directly associated with a fuel cell stack may still include at least one hydrogen-storage device, thereby enabling the product hydrogen streams from these fuel processing assemblies to also be stored for later use.

Fuel cell system 42 may also include a battery 52 or other suitable electricity-storing device that is adapted to store the electric potential, or power output, produced by stack 40. Similar to the above discussion regarding excess hydrogen, fuel cell stack 40 may produce a power output in excess of that necessary to satisfy the load exerted, or applied, by device 46, including the load required to power fuel cell system 42. In further similarity to the above discussion of excess hydrogen gas, this excess power output may be used in other applications outside of the fuel cell system and/or stored for later use by the fuel cell system. For example, the battery or other storage device may provide power for use by system 42 during startup or other applications in which the system is not producing electricity and/or hydrogen gas. In FIG. 2, flow-regulating structures are generally indicated at 54 and schematically represent any suitable manifolds, valves, controllers, switches and the like for selectively delivering hydrogen and the fuel cell stack's power output to device 50 and battery 52, respectively, and to draw the stored hydrogen and stored power output therefrom.

In FIG. 1, fuel processor 12 is shown including a shell 68 in which at least the hydrogen-producing region, and optionally the purification region, is contained. Shell 68, which also may be referred to as a housing, enables the components of the steam reformer or other fuel processing mechanism to be moved as a unit. It also protects the components of fuel processor 12 from damage by providing a protective enclosure and reduces the heating demand of the fuel processing assembly because the components of the fuel processor may be heated as a unit. Shell 68 may, but does not necessarily, include insulating material 70, such as a solid insulating material, blanket insulating material, and/or an air-filled cavity. It is within the scope of the disclosure, however, that the fuel processor may be formed without a housing or shell. When fuel processor 12 includes insulating material 70, the insulating material may be internal the shell, external the shell, or both. When the insulating material is external a shell containing the above-described reforming and/or purification regions, fuel processor 12 further may include an outer cover or jacket 72 external the insulation, as schematically illustrated in FIG. 1.

It is further within the scope of the disclosure that one or more of the components of fuel processing assembly 10 may either extend beyond the shell or be located external at least shell 68. For example, and as discussed, purification region 24 may be located external shell 68, such as with the purification region being coupled directly to the shell (as schematically illustrated in FIG. 3) or being spaced-away from the shell but in fluid communication therewith by suitable fluid-transfer conduits (as indicated in dash-dot lines in FIG. 1). As another example, a portion of hydrogen-producing region 19 (such as portions of one or more reforming catalyst beds) may extend beyond the shell, such as indicated schematically with a dashed line representing an alternative shell configuration in FIG. 1.

Illustrative examples of fuel cell systems and fuel processing assemblies have been schematically illustrated in FIGS. 1-3. These systems may include additional components, such as air/oxidant supplies and delivery systems, heat exchange assemblies and/or sources, controllers, sensors, valves and other flow controllers, power management modules, etc. It is within the scope of the present disclosure to selectively include one or more of these components. Similarly, although a single fuel processor 12 and/or a single fuel cell stack 40 are shown in FIGS. 1-3, it is within the scope of the disclosure that more than one of either or both of these components may be used.

As also shown in FIGS. 1-3, fuel processing assemblies (and fuel cell systems) according to the present disclosure include a heating assembly 60 that is adapted to heat at least the hydrogen-producing region, or reforming region, 19 of the fuel processor. In systems according to the present disclosure, heating assembly 60 includes a burner assembly 62 and may be referred to as a combustion-based, or combustion-driven, heating assembly. Heating assembly 60 is adapted to receive at least one fuel stream 64 and to combust the fuel stream in the presence of air to provide a hot combustion stream 66 that may be used to heat at least the hydrogen-producing region 19 of the fuel processor. Stream 66 may also be referred to as a heated exhaust stream. As discussed in more detail herein, air may be delivered to the heating assembly via a variety of mechanisms. In FIG. 3, an air stream 74 is shown in solid lines; however, it is within the scope of the disclosure for the air stream to additionally or alternatively be delivered to the heating assembly with at least one of the fuel streams 64 for the heating assembly 60. It is within the scope of the disclosure that combustion stream 66 may additionally or alternatively be used to heat other portions of the fuel processing assembly and/or fuel cell systems with which heating assembly 60 is used.

In FIGS. 1-3, heating assembly 60 is shown in an overlapping relationship with fuel processor 12 to graphically represent that it is within the scope of the disclosure that the heating assembly may be located partially or completely within fuel processor 12, such as being at least partially within shell 68, and/or that at least a portion, or all, of the heating assembly may be located external the fuel processor. In this latter embodiment, the hot combustion gases from the burner assembly will be delivered via suitable heat transfer conduits to the fuel processor or other portion of the system(s) to be heated.

As indicated in dashed lines in FIG. 3, fuel processors 12 according to the present disclosure may include a vaporization region 69 that is adapted to receive a liquid feed stream 16 (or a liquid component of feed stream 16, such as a stream of water 17 or a stream of a liquid carbon-containing feedstock 18) and to vaporize the feed stream (or portion thereof) prior to delivery to hydrogen-producing region 19 of fuel processor 12. As indicated schematically in FIG. 3, heated combustion stream 66 from the heating assembly may be used to vaporize the feed stream in vaporization region 69 and/or otherwise heat the feed stream. It is within the scope of the disclosure that fuel processor 12 may be constructed without a vaporization region and/or that the fuel processor is adapted to receive a feed stream that is gaseous or that has already been vaporized.

As discussed, many conventional fuel processors, such as steam and autothermal reformers and pyrolysis and partial oxidation reactors, require a carbon-containing feedstock that is used in the hydrogen-producing reaction, and then a separate fuel stream, typically a carbon-containing feedstock, that is used as a fuel source for the heating assembly. As such, these conventional fuel processing assemblies require a separate source, pump, or other delivery assembly, transport conduits, and flow-regulating devices, etc. According to an aspect of the present disclosure, a liquid-phase carbon-containing feedstock 84 may be used for both carbon-containing feedstock portion 18 of feed stream 16 for reforming region 19 and carbon-containing feedstock portion 65 of fuel stream 64 for heating assembly 60, such as schematically illustrated in FIG. 4. This dual use of carbon-containing feedstock 84 is not required to all embodiments of the present disclosure. In the illustrative example shown in FIG. 4, liquid carbon-containing feedstock 84 is delivered to both heating assembly 60 and hydrogen-producing region 19. FIG. 4 has been shown in a fragmentary view because fuel processor 12 may have a wide variety of configurations, such as configurations that do not include a purification region, that utilize more than one type or number of purification mechanism, etc. It is intended that the fragmentary fuel processor shown in FIG. 4 (and subsequent figures) schematically represents any of these configurations, as well as any of the steam reformers and other fuel processors described, illustrated and/or incorporated herein.

Figure 5:
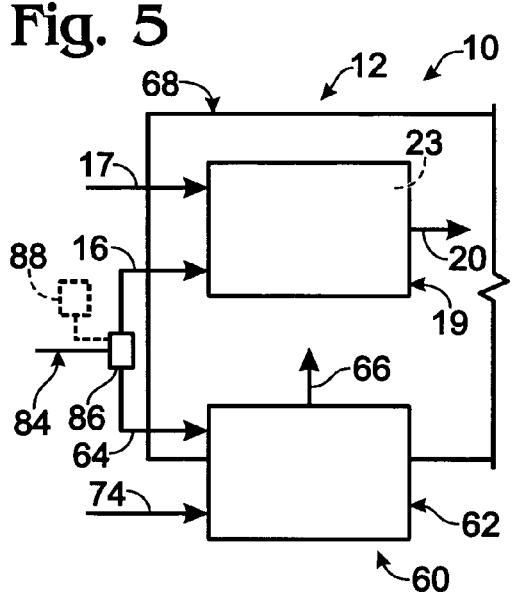
FIG. 5 is a schematic view showing a variation of the fuel processing assembly of FIG. 4, with a carbon-containing feedstock being delivered to the hydrogen-producing region and the burner assembly from the same supply stream.

FIG. 5 is similar to FIG. 4, except that the liquid carbon-containing feedstock 84 is delivered as a single stream to valve assembly 86, in which the carbon-containing feedstock is selectively delivered to at least one of the heating assembly and the hydrogen-producing region. Valve assembly 86 may include any suitable structure for selectively dividing the stream of carbon-containing feedstock between the heating assembly and the hydrogen-producing region. The range of possible configurations includes the heating assembly receiving all of the carbon-containing feedstock, the hydrogen-producing region receiving all of the carbon-containing feedstock, or both the heating assembly and the hydrogen-producing region receiving carbon-containing feedstock. As discussed herein, the distribution of the carbon-containing feedstock depends at least in part upon the particular carbon-containing feedstock being used, whether byproduct stream 28 is also used as a fuel for at least a portion of heating assembly 60 (such as a primary burner assembly 58), and the particular mode of operation of the fuel processor, such as an idle mode, a startup mode, or a hydrogen-producing mode.

The distribution of liquid carbon-containing feedstock 84 between the hydrogen-producing region and the heating assembly may be manually controlled. However, in many embodiments, it may be desirable for the distribution to be predetermined and/or at least partially automated, such as by including a controller 88 that selectively regulates the delivery of feedstock 84 between the hydrogen-producing region and the heating assembly. An example of a suitable controller for a steam reforming fuel processor is disclosed in U.S. Pat. No. 6,383,670, the complete disclosure of which is hereby incorporated by reference. In some embodiments, controller 88 and/or valve assembly 86 may be configured to allow a predetermined initial volume of carbon-containing feedstock into heating assembly 60, as will be discussed in greater detail herein.

Figure 6:
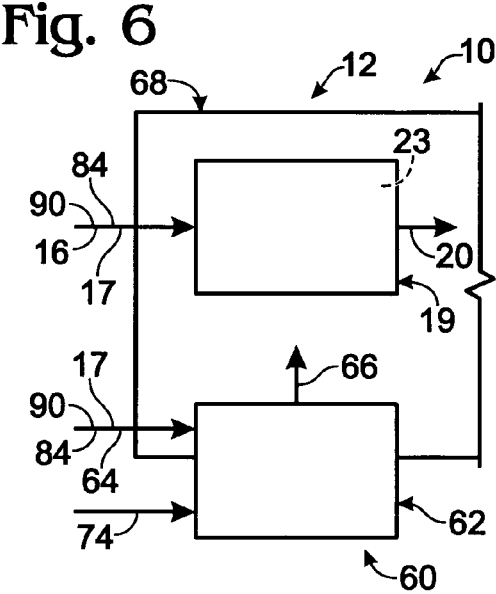
FIG. 6 is a schematic view of a fuel processing assembly according to the present disclosure in which the hydrogen-producing region and the burner assembly both receive fuel, or feed, streams containing water and a liquid carbon-containing feedstock.
Figure 7:
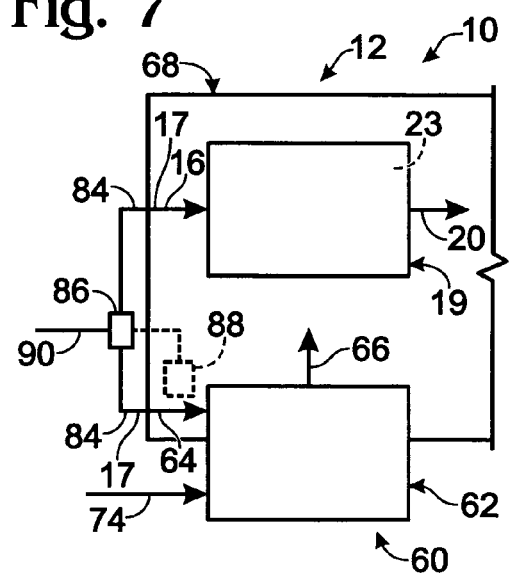
FIG. 7 is a schematic view showing a variation of the fuel processing assembly of FIG. 6, with the hydrogen-producing region and the burner assembly both receiving fuel, or feed, streams containing water and a carbon-containing feedstock from the same supply stream.

As discussed previously, in the context of a steam reformer or other fuel processor that produces hydrogen gas from water and a carbon-containing feedstock, feed stream 16 may be at least substantially, and typically entirely, comprised of a mixture of water and a liquid-phase carbon-containing feedstock 84 that is preferably miscible in, or with, water. As such, a single (composite) feed stream 90 containing water 17 and carbon-containing feedstock 84 can be consumed as both the hydrogen-producing feed stream 16 for the reforming reaction, as well as the heating assembly fuel stream 64. Further reduction in the supplies, delivery systems, flow regulators, delivery conduits and the like may be achieved according to another aspect of the present disclosure by feed stream 16 and fuel stream 64 both containing the same liquid carbon-containing feedstock 84 and water 17, with the carbon-containing feedstock preferably being miscible in water. This is schematically illustrated in FIGS. 6 and 7, in which this composite stream is indicated at 90. Streams 16 and 64 may have nearly, or completely, identical compositions, and may be entirely formed from stream 90. It is within the scope of the disclosure, however, that at least one of streams 16 and 64 may have at least one additional component or additional amount of water or carbon-containing feedstock added thereto prior to consumption of the stream by the heating assembly or hydrogen-producing region. Similarly, it is within the scope of the present disclosure that additional streams may deliver additional components or additional amounts of water or carbon-containing feedstock to the heating assembly or the fuel processor.

Similar to the previously discussed alternatives of FIGS. 4 and 5 (where only the carbon-containing feedstock component 84 of feed stream 16 was delivered to heating assembly 60 rather than both the carbon-containing feedstock 84 and the water 17), composite feed stream 90 may be selectively delivered to heating assembly 60 and hydrogen-producing region 19 in separate streams from the same source or from different sources, as schematically illustrated in FIG. 6. Alternatively, and as schematically illustrated in FIG. 7, a single composite feed stream 90 may be delivered to the fuel processing assembly, and more specifically to a valve assembly 86, where the stream is selectively divided between the heating assembly and the hydrogen-producing region. A controller 88, which may be a manual controller or a computerized or other electronic controller or preprogrammed controller, is also shown in dashed lines in FIG. 7. Controller 88 may be located internal or external fuel processor 12, and/or may include both internal and external components.

The relative amounts of water 17 and liquid carbon-containing feedstock 84 in composite feed stream 90 may vary within the scope of the present disclosure. For example, the ratio may depend upon such factors as the particular carbon-containing feedstock being used, the hydrogen-producing mechanism being used in the fuel processor, user preferences, the catalyst being utilized, the demand for hydrogen gas, the efficiency of the reforming catalyst, etc. The relative concentrations of these components may be expressed in terms of a ratio of water to carbon. When feedstock 84 is methanol, a 1:1 molar ratio of steam to carbon has proven effective. When feedstock 84 is ethanol, a ratio of 2-3:1 has proven effective. When feedstock 84 is a hydrocarbon, a ratio of approximately 3:1 is typically used. However, the illustrative ratios described above are not meant to be exclusive ratios within the scope of the disclosure, and others, including greater and lesser ratios, may be used.

Figure 8:
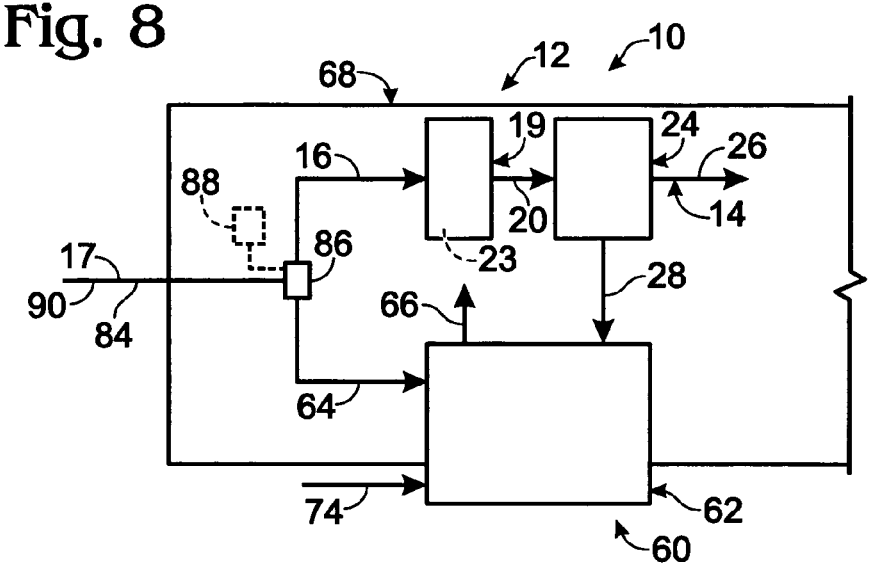
FIG. 8 is a schematic view showing another variation of the fuel processing assemblies of FIGS. 6 and 7.

In FIG. 8, a variation of the configuration of FIG. 7 is shown to illustrate that it is within the scope of the present disclosure that valve assembly 86 may be located either internal or external fuel processor 12. FIG. 8 also illustrates that when the fuel processor includes or is otherwise associated with a purification region 24 that produces a gaseous byproduct stream 28, the gaseous byproduct stream 28 may be delivered to the heating assembly to be used as a gaseous fuel for the heating assembly. This gaseous fuel may supplement the liquid fuel discussed above (such as carbon-containing feedstock 84 or composite feed stream 90), or may itself contain sufficient heating value for certain steam reformers or other fuel processors and/or certain operating configurations of the fuel processors.

Fuel processor 12, heating assembly 60, and feedstock delivery system 22 may be configured in any of the arrangements described above. In some embodiments, features or aspects from one or more of the above described configurations may be combined with each other and/or with additional features described herein. For example, it is within the scope of the present disclosure that fuel processors 12 which include at least one purification region 24 may (but are not required to) house the hydrogen-producing region 19 and at least a portion of the purification region together in a common housing, with this housing optionally being located within the shell 68 of the fuel processor. This is schematically illustrated in FIG. 9, in which reference numeral 25 generally indicates a hydrogen-producing region 19 of a fuel processor, with the hydrogen-producing region being contained within a housing, or vessel, 27 that contains at least the reforming (or other) catalyst 23 used to produce the mixed gas stream from the feed stream that is delivered to the hydrogen-producing region.

Figure 9:
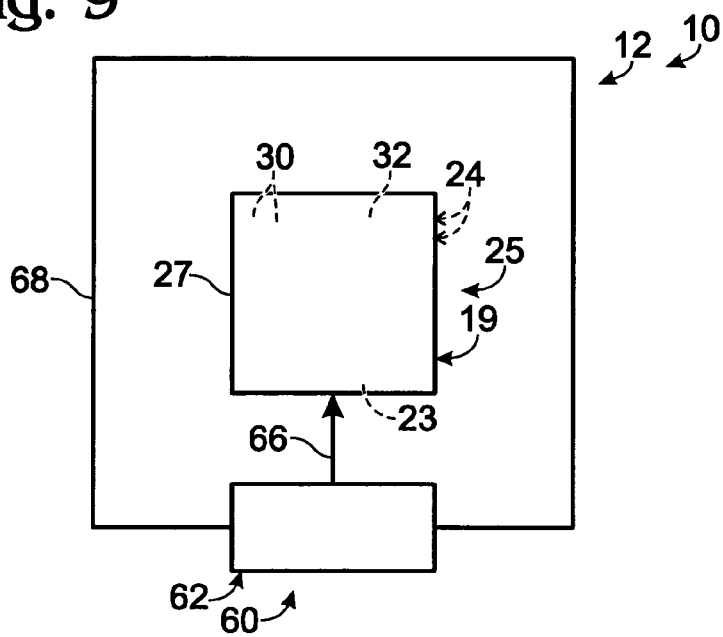
FIG. 9 is a schematic view of another example of a fuel processing assembly according to the present disclosure.

As indicated in dashed lines in FIG. 9, shell 27 (and thereby region 25) may, but is not required to, also include a purification region 24. For example, as illustrated in dashed lines in FIG. 9, the purification region, when present in the housing, may include one or more hydrogen-selective membranes 30 and/or a chemical carbon monoxide removal assembly 32. Accordingly, region 25 may be described as a hydrogen-producing and purifying region when it contains both a hydrogen-producing region 19 and a purification region 24. It is within the scope of the disclosure that any of the regions 19 and 24 described, illustrated and/or incorporated herein may be used in region 25. When region 25 does not include a purification region, it may simply be described as a hydrogen-producing region 19 that includes a housing 27. When housing 27 includes a purification region 24, it is still within the scope of the present disclosure that the fuel processing assembly may include one or more additional purification regions (such as which may include the same or different purification devices/mechanisms) external (i.e., downstream from) housing 27. The fuel processing assemblies illustrated herein thereby include a hydrogen-producing region that is contained in a housing, with this housing optionally also containing a purification region.

Some combustible fuel streams 64 that may be delivered to heating assembly 60 are liquid-phase fuel streams at the operating parameters at which the fuel stream is delivered to heating assembly 60. As a non-exclusive example, the fuel stream may be delivered to the heating assembly as a liquid fuel stream at a temperature in the range of approximately 25° C. to approximately 100° C., although temperatures above and below this illustrative range may be used without departing from the scope of the present disclosure. As used herein, "liquid" or "liquid-phase" is meant to refer to fuel streams that include at least a majority, if not most or even all, or nearly all, of the fuel in the liquid phase at the operating parameters at which the fuel stream is delivered to the heating assembly. Additionally, when fuel stream 64 includes carbon-containing feedstock 84 or composite stream 90 having carbon-containing feedstock and water, fuel stream 64 delivered to heating assembly 60 may be in the liquid phase at operating parameters at which it is delivered to the heating assembly. The operating parameters discussed above are not intended to be exclusive examples. Instead, they are meant to illustrate typical parameters, with parameters outside of these ranges still being within the scope of the disclosure. In many applications, such as heating assemblies incorporated in fuel processing assemblies for use in portable or mobile uses, the operating parameters for delivery of fuel stream 64 may vary widely depending on the environmental conditions in which the fuel processing assembly is used. For example, fuel processing assemblies may deliver fuel stream 64 to heating assembly 60 at temperatures ranging from lower than 0° C. to higher than 100° C.

Illustrative, non-exclusive examples of other temperature ranges within which the fuel processing assemblies may be used include temperatures of less than 30° C., less than 20° C., less than 10° C., less than −10° C., less than −20° C., less than −30° C., less than −40° C., temperatures in the range of −50° C. and 100° C., temperatures in the range of −50° C. and 50° C., temperatures in the range of −50° C. and 30° C., temperatures in the range of −30° C. and 50° C., and temperatures in the range of −30° C. and 30° C. As discussed, during startup of the fuel processing assembly, the heating assembly is adapted to receive and initiate combustion of a liquid fuel stream. Some liquid fuels may not be liquids in regions of the illustrative temperature ranges described above, and accordingly, the composition of the liquid fuel to be used may be selected with factors that include the expected ambient temperature around the fuel processing assembly. For example, methanol will not be a liquid at 100° C.

Figure 10:
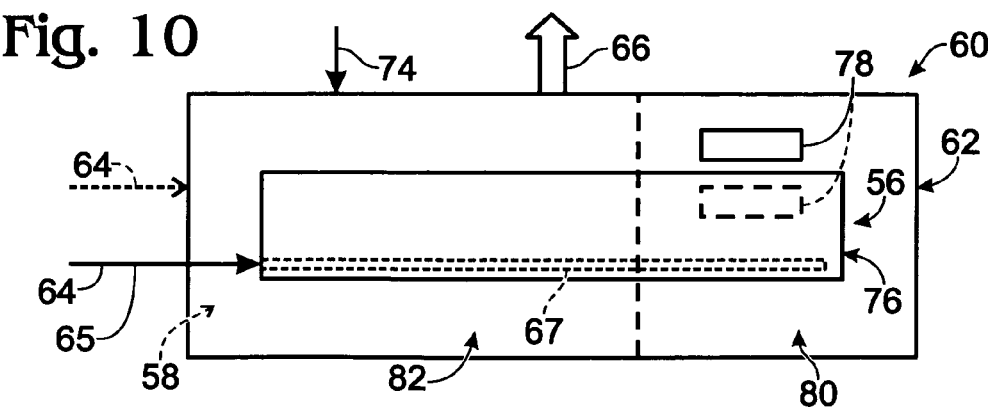
FIG. 10 is a schematic view of a heating assembly according to the present disclosure.

In FIG. 10, an illustrative heating assembly 60 within the scope of the present disclosure is illustrated schematically. Heating assembly 60 includes burner assembly 62 and may include associated inlets, outlets, and other features appropriate and consistent with the heating assembly description provided herein. As indicated schematically in FIG. 10, burner assemblies 62 according to the present disclosure include a start-up burner assembly 56 and, in some embodiments, also may include a primary, or main, burner assembly 58. As the name implies, the start-up burner assembly is adapted to heat at least the hydrogen-producing region of the fuel processor to a suitable hydrogen-producing temperature. The primary, or main, burner is adapted to provide continued heating to at least the hydrogen-producing region of the fuel processor during continued hydrogen-producing operation of the fuel processor. The primary burner may be adapted to consume a gaseous fuel stream, with this gaseous fuel stream being partially or completely formed from a portion of the mixed gas stream produced by the hydrogen-producing region. It is within the scope of the present disclosure that the start-up and primary burner assemblies, when both present in a particular embodiment, may be separate assemblies and/or may share one or more components.

Heating assembly 60 is illustrated in FIG. 10 in isolation from fuel processor 12 and the remaining components of fuel processing assembly 10. However, as discussed above, heating assembly 60, such as the heating assembly shown schematically in FIG. 10, may be in thermal communication with the reforming region or may otherwise be adapted to heat portions of the fuel processing assembly including the reforming region. As discussed above, heating assembly 60 may be disposed within shell 68 of fuel processor 12 or may be located at least partially, or completely, external of the shell. Appropriate conduits, conducting materials, and other apparatus may be provided to communicate the thermal energy in combustion stream 66 to the reforming region of the fuel processor.

As illustrated schematically in FIG. 10, heating assembly 60 includes at least one fuel chamber 76 and at least one heating and ignition source 78 and is adapted to receive at least one air stream 74. Air stream 74 may be positively delivered to the heating assembly, such as with a blower, fan, compressor, pressurized source, or other suitable device or assembly for delivering an air stream to the heating assembly. Additionally, or alternatively, the heating assembly may be sufficiently open to the environment to draw or otherwise be exposed to a suitable flow of air to support combustion in the heating assembly.

The at least one fuel chamber is configured to receive at least a portion of fuel stream 64. Fuel stream 64 includes a carbon-containing feedstock 65 and may include additional components such as water, air, oxygen, hydrogen, or other components that are combustible, non-combustible, and/or necessary for combustion, such as air or oxygen. While a single fuel stream 64 is shown in FIG. 10, it is within the scope of the present disclosure that more than one stream 64 may be used and that the additional streams may supply the same or different carbon-containing feedstocks, other combustible fuels, air, or other components. This is schematically illustrated by the inclusion of a second fuel stream 64 in dashed lines in FIG. 10. Additionally, as discussed above, fuel stream 64 may include liquid, carbon-containing feedstock 84 that is the same carbon-containing feedstock delivered to fuel processor 12. Similarly, fuel stream 64 may include composite stream 90 that includes carbon-containing feedstock 84 and water 17, and which may have the same, or essentially the same composition as the feed stream for the hydrogen-producing region of the fuel processor.

As discussed, heating assembly 60 also includes a heating and ignition source 78. Source 78 is adapted to heat and initiate combustion of the carbon-containing feedstock 65 (or 84) in fuel stream 64. Heating and ignition source 78 may be disposed or otherwise positioned external to fuel chamber 76, as shown in solid lines, may be disposed within fuel chamber 76, as shown in dashed lines, or may be disposed partially inside and partially outside of fuel chamber 76. Heating and ignition source 78 may include any suitable structure or device for heating and igniting the fuel stream in the presence of air to initiate combustion thereof. In some embodiments, heating and ignition source 78 may include more than one device.

Examples of suitable heating and ignition sources 78 include at least one of a spark plug, a glow plug, a pilot light, a combustion catalyst, glow plugs in combination with combustion catalysts, electrically heated ceramic igniters, and the like. In some embodiments, heating and ignition source 78 includes an electrical resistance heating element either alone or in combination with an igniter, such as a spark plug. A glow plug is one example of an electrical resistance heating element that may be used alone to both heat and ignite the carbon-containing fuel received by the fuel chamber. Heating and ignition source 78 may include an electrical resistance heating element configured to be heated to a temperature sufficiently hot, also referred to as a red hot or glowing hot temperature, to ignite the carbon-containing fuel in fuel chamber 76.

FIG. 10 also illustrates schematically that heating assembly 60 may include an ignition region 80 and a combustion region 82, schematically represented by the dashed line dividing the two regions. In such embodiments, the carbon-containing fuel disposed in the fuel chamber may be mixed with air and ignited in the ignition region 80 and combusted to produce heated combustion stream 66, which may be exhausted from heating assembly 60 to heat at least the reforming region of fuel processor 12. It is within the scope of the present disclosure that the combustion initiated in ignition region 80 may extend to other locations within heating assembly 60 and/or fuel processing assembly 10. For example, the combustion may continue in the ignition region, and may also extend to combustion region 82 such that after ignition combustion occurs in both the combustion region and the ignition region. Additionally, due to the dispersion of the fuel vapor, combustion may occur in other portions of the fuel processing assembly. As used herein, ignition region 80 is used to refer to an area or region in fuel chamber 76 that is smaller than the entirety of the fuel chamber. That is, ignition region 80 is a subset of fuel chamber 76 that may be physically defined or may be an area of fuel chamber 76, such as a particular end region, corner region, etc.

As illustrated in solid lines in FIG. 10, fuel stream 64 is delivered as a volume of liquid, at least a substantial portion of which (if not all of which) remains as a liquid fuel supply within the fuel chamber until it is consumed to support combustion within the fuel chamber, as discussed in more detail herein. Fuel stream 64 may be delivered to an aperture or fill port of the fuel chamber through a suitable fluid conduit, with the liquid fuel thereafter flowing within the fuel chamber, such as under the force of gravity adsorptive/wicking forces applied by any structures within the fuel chamber, etc. It is within the scope of the present disclosure that the heating assembly may include at least one distribution conduit that extends within the fuel chamber and through which the liquid fuel stream flows prior to being dispensed from the distribution conduit within the fuel chamber. The distribution conduit may include apertures or other outlets along its length, may include an outlet (such as at its distal end within the fuel chamber), and/or may include one or more branches to further distribute the liquid fuel stream within the fuel chamber. While not required to all embodiments, the distribution conduit, when used, may be adapted to selectively deliver at least a portion of the liquid fuel stream beneath, or proximate to, the heating and ignition source, to distribute the liquid fuel stream to one or more selected regions of the fuel chamber, etc. When the fuel chamber includes a transport medium, as described herein, a distribution conduit may (but is not required to be) used to deliver the liquid fuel stream through at least a portion of the transport medium prior to dispensing the liquid fuel from the conduit and into the fuel chamber. In FIG. 10, a distribution conduit is schematically illustrated at 67 and is shown extending within the fuel chamber at least to a region proximate, or even beneath, the heating and ignition source.

In operation, and as described above, fuel stream 64 may be delivered to heating assembly 60 as a liquid, or at least partially in a liquid phase. Fuel stream 64 may be delivered to fuel chamber 76 under operating conditions, or delivery conditions, that include a first temperature and a first pressure. The carbon-containing feedstock(s) delivered to the fuel chamber may have a flash point, or minimum ignition temperature, that is higher than the first temperature at which the carbon-containing feedstock(s) is delivered to the fuel chamber. As used herein, "flash point" refers to the minimum temperature at which the vapor pressure of the liquid is sufficient to form an ignitable mixture with air near the surface of the liquid.

Figure 11:
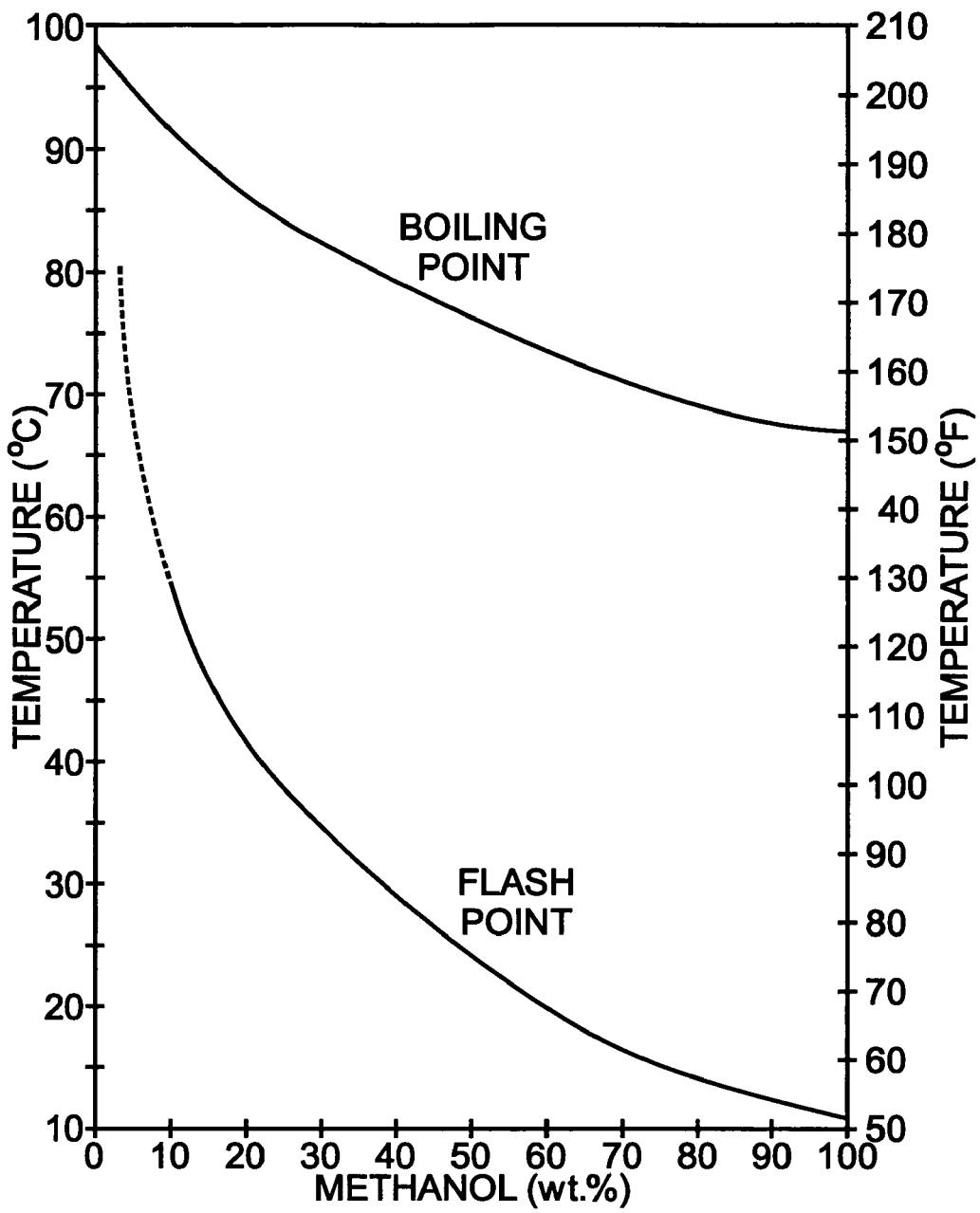
FIG. 11 is a graph illustrating the relationship between the flash point of a methanol-water solution and the weight percentage of methanol in solution.

The flash point for the fuel stream received by fuel chamber 76 may depend upon such factors as the carbon-containing feedstock in the fuel stream, the relative concentrations of carbon-containing feedstock and other components in the fuel stream, the conditions in the fuel chamber, etc. Using composite stream 90 as an exemplary fuel stream 64, FIG. 11 illustrates the flash point of a methanol-water solution for various concentrations of methanol in water. FIG. 11 is representative of flash point curves that may be generated for the various fuel stream compositions that may be used with the heating assembly of the present disclosure, with a stream of methanol and water being an illustrative, but not exclusive, example of a suitable fuel stream. As illustrated in FIG. 11, the flash point temperature decreases with increasing concentrations of methanol. As discussed, other carbon-containing feedstocks may be used, such as other carbon-containing feedstocks that are miscible with water. These other carbon-containing feedstocks may have similar flash point curves for solutions of the feedstock and water, but it is not required that all carbon-containing feedstocks within which the heating assemblies and fuel processing assemblies of the present disclosure have a flash point curve that corresponds or is similar to that of methanol-water mixtures.

While the flash point refers to the minimum temperature at which a liquid fuel will have a vapor pressure above its surface sufficient to form an ignitable mixture with air, whether the mixture will ignite is dependent upon the concentration of the combustible fuel vapor in the air at the location of the ignition source. For example, if the ignition source is spaced-apart from the surface of the liquid carbon-containing feedstock, a number of factors may have diluted the concentration of the combustible fuel vapor. The lower flammability limit is often used to refer to the minimum concentration of the combustible fuel vapor in air for which a flame can propagate. As used herein, "ignition vapor pressure" may be used to refer to the minimum vapor pressure at which ignition of the fuel in air will occur.

The temperature of the liquid carbon-containing feedstock in fuel chamber 76 necessary to produce an ignitable vapor concentration (i.e., a concentration at least equal to the lower flammability limit) may be higher than the flash point temperature and will be referred to herein as the ignition temperature. While the ignition temperature accounts for environmental factors such as availability of fresh air in the vapor space above the liquid fuel in the area adjacent the ignition source and the ability of the fuel vapor to exit the fuel chamber, the ignition temperature will be referred to herein as a property of the carbon-containing fuel.

The fuel stream may enter the fuel chamber at a first temperature and may have an ignition temperature greater than the first temperature. In some embodiments, the carbon-containing fuel delivered to the fuel chamber may have an ignition partial pressure, and the carbon-containing fuel in the fuel chamber may have an initial partial pressure less than its ignition partial pressure. In some applications of heating assembly 60, the first temperature (delivery temperature) of fuel stream 64 may be such that there is substantially no carbon-containing feedstock in the vapor phase. In other applications, the fuel stream may be delivered at a first temperature at which there is some carbon-containing feedstock in the vapor phase. However, in many applications the concentration of carbon-containing feedstock in the vapor phase at the first temperature will not be sufficient to form a flammable mixture at the location of heating and ignition source 78. That is, the first temperature will be less than the ignition temperature of the carbon-containing fuel. Cold weather applications and configurations where fuel stream 64 includes composite stream 90 having water 17 and carbon-containing feedstock 84 are exemplary, though not exclusive, applications where the first temperature will not yield sufficiently high concentrations of carbon-containing feedstock vapor, or fuel vapor, to form an ignitable mixture at the heating and ignition source.

Figure 12:
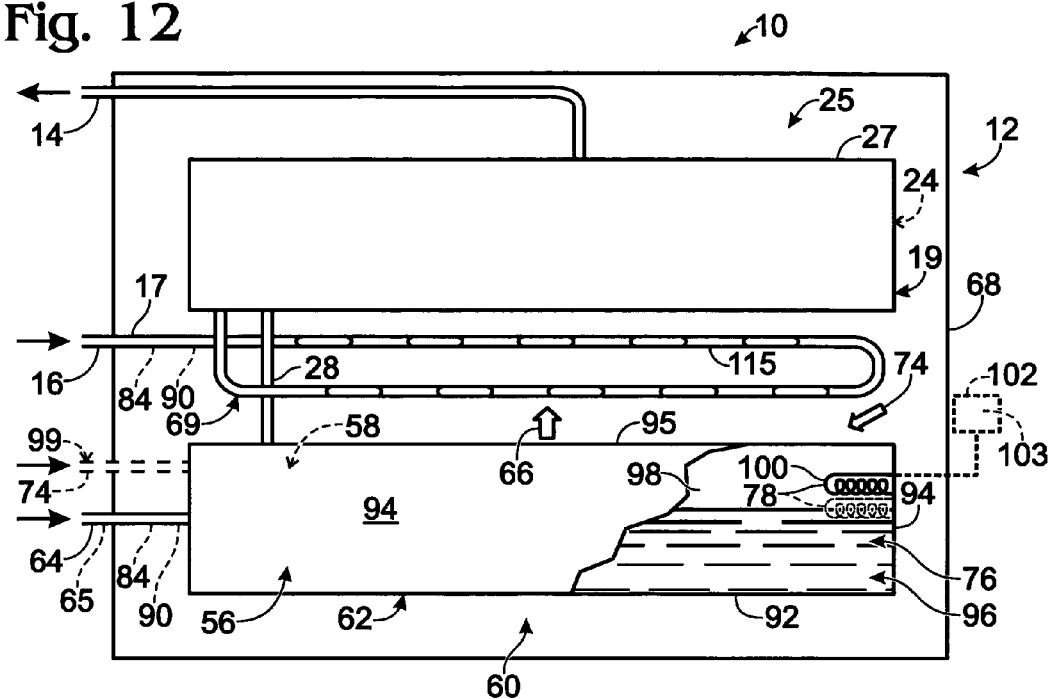
FIG. 12 is another schematic view of a fuel processing assembly including a partial cut-away view of a heating assembly according to the present disclosure.

Referring now to FIG. 12, a somewhat schematic side view of a fuel processing assembly 10 is illustrated, including a partial cutaway view of heating assembly 60. As shown, fuel stream 64 delivers a carbon-containing liquid fuel to heating assembly 60. The carbon-containing fuel may include the same carbon-containing feedstock 84 that is delivered to the reforming region 19 or may include another carbon-containing feedstock 65. Fuel stream 64 may also deliver composite stream 90 having carbon-containing feedstock 84 and water 17, which may, but is not required to, have the same composition and water to carbon ratio as the feed stream for the reforming region.

Start-up burner assembly 56 of heating assembly 60 includes a fuel chamber 76 that is adapted to receive the fuel stream. Fuel chamber 76 includes a bottom 92 and side walls 94. As illustrated, fuel chamber 76 has a partially, or completely, open top 95, and thereby forms an open reservoir for retaining the liquid fuel delivered thereto. Air stream 74 may be delivered (by blowers, fans, or other suitable devices) and/or may naturally flow to fuel chamber 76 from the environment through open top 95. As illustrated in FIG. 12, the reforming region 19 or other portion of the fuel processing assembly to be heated by combustion exhaust stream 66 will typically be located above, and often relatively close to, the open top of the fuel chamber. This enables the combustion stream to heat this structure as the stream naturally flows from the fuel chamber. As discussed, blowers, fans and other suitable structures may additionally or alternatively be used to promote the delivery of the heated combustion stream to reforming region 19 and/or other regions of the fuel processing assembly.

Figure 13:
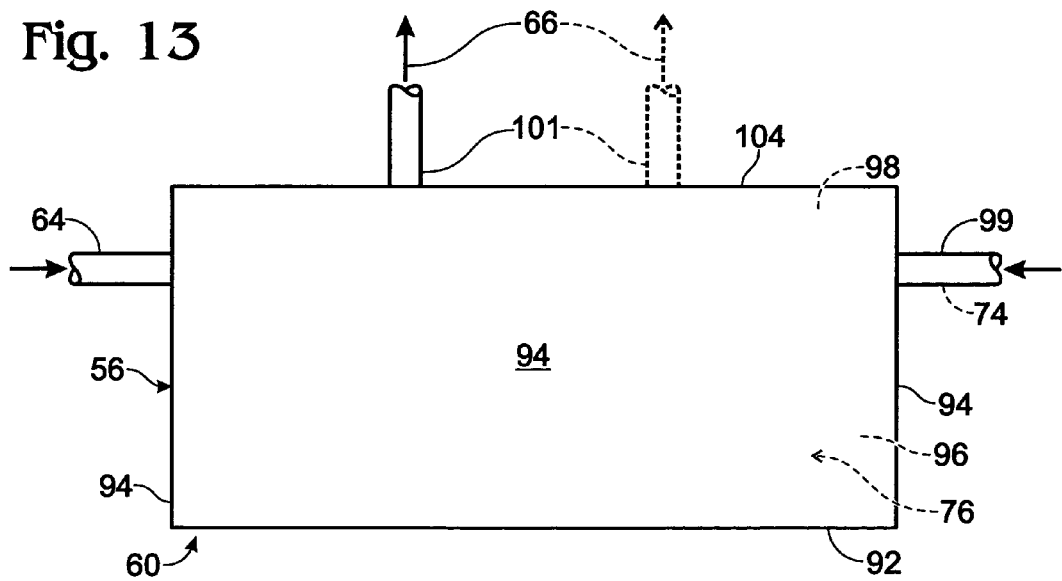
FIG. 13 is another schematic view of a heating assembly according to the present disclosure.

In some embodiments, fuel chamber 76 may include a full or partial top member 104 for enclosing, either completely or partially, the fuel chamber. When fuel chamber 76 includes a full, or closed, top member to form a substantially closed combustion chamber, fuel chamber 76 also may include one or more air inlets 99 to allow air to enter the fuel chamber for combustion, such as air stream 74 described above, and also may include one or more exhaust ports 101. An example of such an embodiment is schematically illustrated in FIG. 13 and may include any of the internal configurations and components discussed and/or illustrated herein. The air inlets and exhaust ports may be configured for natural air flow or may be coupled to pumps, blowers, compressors, valves, or other equipment for controlled or pressurized fluid flow. An inlet port 99 for air stream 74 is also shown in dashed lines in FIG. 12 to graphically depict that (at least partially) open top fuel chambers also may include one or more inlet and/or exhaust ports. The closed top of the illustrated heating assembly of FIG. 13 may produce more radiant heat than a comparable open top heating assembly, and through the use of exhaust port(s) 101 (and associated fluid conduits extending therefrom), may be configured to deliver combustion exhaust stream 66 to one or more selected regions or structures of the fuel processing assembly, including regions that would be more difficult to suitably heat merely by the convective flow of the heated exhaust stream through an open top of the fuel chamber.

With continued reference to FIG. 12, fuel chamber 76 may be described as including a liquid fuel region 96 and a fuel vapor region 98. As illustrated, fuel chamber 76 is an open reservoir and fuel vapor region 98 is defined by the surface of the liquid fuel in the liquid fuel region 96 and by side walls 94 of fuel chamber 76, but is unbounded on top (i.e., theoretically the fuel vapor region extends as far as the fuel vapor can dissipate within the fuel processing assembly). In embodiments where fuel chamber 76 includes a top member, whether full or partial, fuel vapor region 98 may be said to be at least partially bounded on the top by the full or partial top member.

Heating assembly 60 also includes a heating and ignition source 78, as described briefly above. As illustrated in FIG. 12, heating and ignition source 78 takes the form of an electrical resistance heating element 100 that is disposed completely in fuel vapor region 98. As shown, the heating and ignition source is illustrated being positioned above the liquid fuel region of the fuel chamber. However, it is within the scope of the present disclosure that at least a portion of the heating and ignition source be disposed in liquid fuel region 96, as illustrated in dashed lines in FIG. 12. Similarly, it is within the scope of the present disclosure that other functionally suitable structures may be used for heating and ignition source 78, with the electrical resistance heating element, and its illustrated coiled configuration, merely being illustrative, non-exclusive examples. While heating and ignition source 78 is shown adjacent to one end of heating assembly 60, it is within the scope of the present disclosure that heating and ignition source 78 may be disposed anywhere within heating assembly 60 where at least a portion of it may be in sufficient contact with fuel vapor to ignite the carbon-containing fuel in the fuel chamber. As illustrative, non-exclusive examples, the heating and ignition source may be positioned along a lateral wall of the fuel chamber, may be located within a perimeter region of the fuel chamber, may be located within a central region of the fuel chamber, etc.

With continuing reference to FIG. 12, heating and ignition source 78 is illustrated as being in a coiled configuration and as a unitary device. Other configurations are within the scope of the present disclosure. For example, a unitary heating and ignition source 78 may be linear, may include linear and curved portions, or may be otherwise curled, bent, or configured in other shapes or configurations. Additionally or alternatively, heating and ignition source 78 may include more than one device, such as two, three, or more components. For example, a first device may be configured to heat the liquid carbon-containing fuel in the fuel chamber while a second device may be configured to provide the ignition source. The ignition source may be a spark plug or other intermittent, or selectively actuated, ignition source or may be a glow plug or other source that provides a red hot surface of sufficient temperature to ignite the fuel vapor in the fuel chamber. As another example, two or more complete heating and ignition devices may be used, such as two or more spaced-apart resistance heating elements.

As discussed, heating and ignition source 78 may include one or more devices. Regardless of the configuration, heating and ignition source 78 can be understood to provide a heating area and an ignition area. The heating area and the ignition area may be separate portions of the source 78, they may be the same portions of the source, or they may include overlapping portions of the source. In a unitary heating and ignition source disposed entirely in the fuel vapor region, for example, the heating area and the ignition area may be coextensive. In multi-component heating and ignition sources, one component may be (at least primarily) configured to heat the liquid while the other component is (at least primarily) configured to ignite the vapor. Additionally or alternatively, a unitary device may be configured with two or more portions of different constructions, such as of different materials, to impart different characteristics or features as discussed herein. One such portion may be better suited (i.e., primarily configured) to heat the liquid while the other portion is better suited to ignite the fuel. Moreover, a unitary heating and ignition source of consistent construction, or any other heating and ignition source, may be disposed with a first portion in the liquid fuel and a second portion in the fuel vapor. In such a configuration, the portion in the liquid fuel may be considered a heating area while the portion in the fuel vapor may be considered an ignition area and, in some applications, a heating source.

As discussed above, heating and ignition source 78 may comprise any number of devices, structures, circuits, members, and/or materials. In some embodiments, heating and ignition source 78 may include an electrical resistance heating element 100. Electrical resistance heating element 100 may include a conventional wire made of suitable electrically resistant materials that generate heat upon receipt of an electric current. Illustrative, non-exclusive examples of such materials include tungsten and Nichrome alloys (such as 80Ni20Cr and 60Ni16Cr24Fe). Additionally, the materials used in electrical resistance heating element 100 may be selected based on their performance in the conditions of the fuel chamber, such as having a high thermal breakdown temperature, being non-reactive with the carbon-containing fuels in the fuel chamber, and being otherwise suitable under other conditions that may affect the ability of the heating and ignition source to heat and ignite the fuel in the fuel chamber. Exemplary materials include silicon-carbide and other refractory materials. It is within the scope of the present disclosure that any suitable material or combination of materials may be used in heating and ignition source 78. The particular materials used in a given embodiment may depend on such factors as the carbon-containing feedstock in the fuel stream, the hydrogen-producing mechanism(s) utilized by the fuel processor, the configuration of the heating assembly and fuel chamber, the configuration and disposition of the heating and ignition source, etc.

With continued reference to FIG. 12, heating and ignition source 78 is illustrated as being optionally coupled to, and/or in communication with, a controller 102 that is adapted to monitor and/or control the operation and/or operating state of the heating and ignition source. Controller 102 may be any suitable manual or automated controller adapted to do at least one of turning the heating and ignition source on and off, controlling the rate of heating of heating and ignition source 78, and controlling its surface temperature over time, among other possible functions. Controller 102 may be disposed entirely within heating assembly 60, partially within heating assembly 60 and partially outside of the heating assembly, or completely outside of heating assembly 60, but in communication with the heating and ignition source. In some embodiments, controller 102 may be outside of heating assembly 60 but within fuel processing assembly 10 as illustrated in FIG. 12. It is also within the scope of the present disclosure that controller 102 may be disposed outside of the fuel processing assembly for more convenient user access during operation of the fuel processing assembly. In some embodiments, controller 102 may include, and/or be in communication with, a power source 103 for the heating and ignition source (such as to regulate the delivery of power therefrom). The controller may be adapted to perform other functions, and accordingly, controller 102 may be implemented as a portion, or functional component, of a controller for the fuel processing assembly and/or fuel cell system within which the heating assembly is utilized.

As discussed, heating assembly 60 (and/or burner assembly 62) may include a primary burner assembly 58 in addition to start-up burner assembly 56. In FIG. 12, a primary burner assembly 58 is schematically illustrated and may be adapted to receive a gaseous fuel stream. For example, byproduct stream 28 may be delivered to the heating assembly for use as a fuel for the primary burner assembly. As discussed in more detail herein, the primary burner assembly, when present, may be positioned in a variety of orientations relative to the start-up burner assembly. These illustrative positions include, but are not limited to, positions in which the primary burner assembly is recessed within the start-up burner assembly, positions in which the primary burner assembly is positioned above (i.e., closer to the hydrogen-producing region) the start-up burner assembly, and positions in which the primary burner assembly and the start-up burner assembly are positioned at the same, or similar, distances relative to the hydrogen-producing region. Although illustrated in the example shown in FIG. 12, it is also within the scope of the present disclosure that the byproduct stream is not delivered to the heating assembly, that another gaseous fuel stream is delivered to the primary burner assembly, that the heating assembly does not include a primary burner assembly, and/or that the byproduct (and/or other gaseous fuel stream) is delivered to the start-up burner assembly for combustion during hydrogen-producing operation of the fuel processing assembly.

Figure 14:
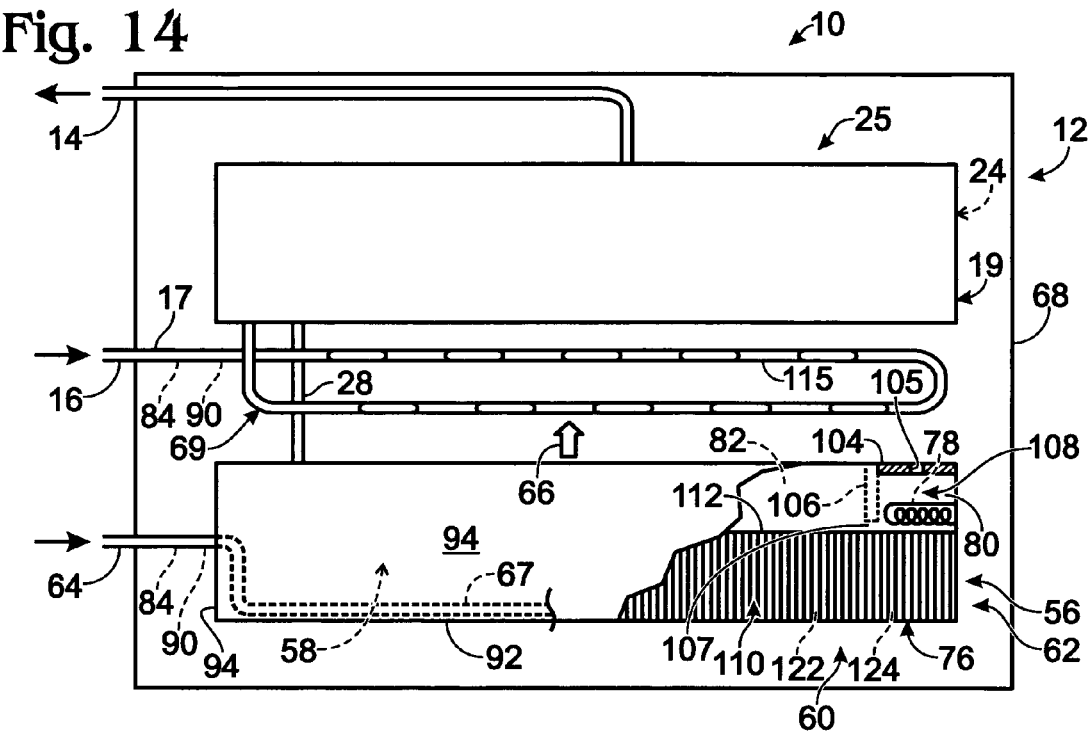
FIG. 14 is a more detailed schematic view of a fuel processing assembly including a partial cut-away view of a heating assembly according to the present disclosure.

FIG. 14 illustrates another example of a fuel processing assembly 10 that includes a fuel processor 12, hydrogen-producing region 19, and heating assembly 60 substantially as described above, with these components being identified with consistent reference numerals as discussed previously. It is within the scope of the present disclosure that any of the structures, elements and/or variants discussed and/or illustrated herein may be used with or in these components and fuel processing assembly 10. As illustrated, FIG. 14 provides another example of a heating assembly 60 that includes a start-up burner assembly 56 and a main burner assembly 58. Heating assembly 60 also includes a fuel chamber 76 and a heating and ignition source 78. Fuel chamber 76 is illustrated with a bottom 92, side walls 94, and a top member 104, which may be a partial top member, as illustrated, or a full top member as discussed above. As illustrated at 105, the top member 104 may, but is not required to, include one or more vents, or air passages, 105 through which an air stream may be drawn or otherwise enter the ignition, vapor and/or combustion region.

Additionally, fuel chamber 76 may optionally include at least one baffle 106, illustrated in dotted lines in FIG. 14, which may cooperate with the top member to at least partially define, or separate, the fuel vapor region and/or the ignition region 80 and combustion region 82. As discussed above, ignition region 80 includes the region in which the initial ignition of the fuel in fuel chamber 76 occurs. Ignition region 80 and combustion region 82 may be distinguished by the ignition region being the area in which the fuel vapor is ignited by the heating and ignition source and the combustion region being any region in which the fuel is combusted by propagation of the flame from the ignition region. In some embodiments, the ignition region 80 and combustion region 82 may be separated from each other. One example of such a configuration is illustrated in FIG. 14 with the inclusion of the optional baffle 106 and top member 104. As illustrated, baffle 106 extends downward from top member 104 to form an at least partially enclosed ignition chamber 108. Heating and ignition source 78 is disposed within ignition chamber 108 and may be disposed in the fuel vapor region therein, the liquid fuel region therein, or partially in both the liquid fuel region and the vapor fuel region, as discussed above.

Ignition chamber 108 may be configured to at least partially confine the fuel vapor evaporating from the liquid fuel as the heating and ignition source heats the fuel chamber. By at least partially confining the fuel vapor, ignition chamber 108 may facilitate or assist in initiating ignition of the (heated) fuel by reducing the dissipation of the fuel vapor and minimizing the possibility that fuel vapor can be blown away from the heating and ignition source by environmental conditions. These factors otherwise could result in an actual ignition temperature or flash point that is above the theoretical ignition temperature or flash point of the particular fuel composition. When fuel chamber 76 includes an ignition region 80, such as ignition chamber 108, it is within the scope of the present disclosure that the ignition region may be in communication with the combustion region such that the flame and combustion initiated in the ignition region can propagate to the combustion region. This is illustrated in FIG. 14 by baffle 106 terminating above the surface of the liquid fuel region, and thereby defining a flame passage 107 through which the flame and combustion may travel or propagate out of ignition chamber 108 to the remainder of fuel chamber 76.

With reference to FIGS. 12 and 14, vaporization region 69 is illustrated as a length of tubing 115 that extends generally intermediate, or between, heating assembly 60 and hydrogen-producing region 19. In the illustrated example, the vaporization region (i.e., tubing 115), is configured to define a plurality of flow paths that extend generally parallel to the heating assembly and the hydrogen-producing region, thereby providing a comparatively greater heat transfer effect than if the feed stream merely passed between the heating assembly and the hydrogen-producing region a single time. The illustrated example also demonstrates that the tubing extends along a sinusoids or other laterally-extending path beneath the hydrogen-producing region, which also increases the heat transfer effect (i.e., the amount of time that the feed stream is heated by the heated exhaust stream prior to being delivered to the hydrogen-producing region. The illustrated example is intended to be just that, an example, as the shape, orientation, length, cross-sectional area, relative position to the hydrogen-producing region and/or heating assembly, number of paths, etc. of the vaporization region may vary without departing from the scope of the present disclosure. Regardless of its particular configuration, the region should be designed to receive the liquid feed stream that will be used to produce hydrogen gas in the hydrogen-producing region of the fuel processor and to deliver this stream as a vaporized feed stream to the hydrogen-producing region, with the feed stream being vaporized in the vaporization region through heat exchange with at least the exhaust stream from the heating assembly.

Heating assemblies 60 according to the present disclosure may be used with fuel processing assemblies that do not include a vaporization region for the feed stream for the hydrogen-producing (reforming) region of the fuel processor and/or may include a vaporization region that is not directly heated by stream 66 and/or which is not positioned between the heating assembly and region 19. When configured with a vaporization region that includes at least one length of tubing or other enclosed region in which the feed stream is vaporized by heat exchange with the heated exhaust stream 66 from the heating assembly flowing external the tubing or other region through which the feed stream flows to be vaporized, tubing/region 115 may be formed or shaped in any configuration designed to provide a desired amount of exposure time, and coincident heat transfer, in the vaporization region for the feed stream prior to entering the fuel processor.

FIG. 14 also illustrates that fuel chambers 76 according to the present disclosure may (but are not required to) include a transport medium 110 that is disposed at least substantially in the liquid fuel region of fuel chamber 76. Transport medium 110 may be configured to draw the liquid fuel in fuel chamber 76 to the top, or top surface, 112 of the transport medium for combustion. At least the top surface of the transport medium, and optionally additional regions of the medium proximate the top surface, may extend to the surface and/or out of the liquid fuel region. Accordingly, transport medium 110 may include one or more materials and/or structures adapted to moving (i.e., conveying or otherwise transporting) the liquid fuel from the fuel chamber to the top, or top surface, 112 of the transport medium. Fire-resistant materials and materials adapted to tolerate elevated temperatures and the particular chemical environment of fuel chamber 76 may be utilized. For example, transport medium 110 may include ceramic or glass materials in some embodiments. When a solid block or ceramic or other absorbent material is used as transport medium, this material may, but is not required to, include a plurality of holes or other apertures that are drilled or otherwise formed into the material.

In some embodiments, transport medium 110 may be porous or otherwise adapted to absorb the liquid fuel in fuel chamber 76. Absorbent materials 122 in transport medium 110 may enable the transport medium to prevent spillage of the liquid fuel during transport of a fuel processing assembly having a fuel chamber that is not substantially closed, such as a fuel chamber configured as an at least substantially open-topped reservoir. The absorbent materials may draw in the liquid fuel and be adapted to move the liquid fuel to the top 112 as liquid fuel is consumed. When transport medium 110 is adapted to at least temporarily absorb the liquid fuel that is delivered to the fuel chamber, the transport medium may also be described as a containment medium, in that the liquid fuel that is absorbed by the medium (prior to being combusted) is prevented from spilling from the fuel region, such as if the fuel chamber were suddenly tilted or overturned.

Additionally or alternatively, transport medium 110 may include fibers, tubes or other structures 124 that are adapted to wick, such as by capillary action, the liquid fuel from the bottom of the fuel chamber to the top 112 of transport medium 110, as shown more clearly in FIG. 14. In some embodiments, a plurality of glass fibers may be arranged to provide capillary action to move the liquid fuel to the top of transport medium 110, although this is but one of many suitable structures for medium 110 within the scope of the present disclosure. Similarly, when glass or other absorptive and/or wicking and/or capillary fibers, strands, or other structures 124 are used, they may extend in any suitable orientation, including aligned, woven, and/or random configurations. An illustrative, non-exclusive example of a non-woven configuration is a felt formed from the fibers, or strands. Additional examples include transport media in wool, blanket, mat, pad, and sheet form. An example of a transport medium that has proven effective is Koawool™ Cerablanket™ refractory ceramic fiber, although others may be used. Transport medium 110 may also be referred to as a transport structure, and in some embodiments, a containment structure.

Transport medium 110 may, but is not required to in all embodiments, provide a flame-holding surface in the fuel chamber. For example, transport medium 110 may be configured to provide a flame-holding, or flame-positioning, top surface that is spaced from the fuel processor 12, hydrogen-producing region 19, vaporization region 69, or other portion of fuel processing assembly 10 by a predetermined distance to obtain desired heating properties and thermal communication between the flame of the heating assembly 60 and the remaining components of fuel processing assembly 10. One advantage of utilizing transport medium 110 is that the flame of the combustion can be maintained at a consistent distance from the other components throughout the combustion process even as the liquid fuel is consumed.

Figure 15:
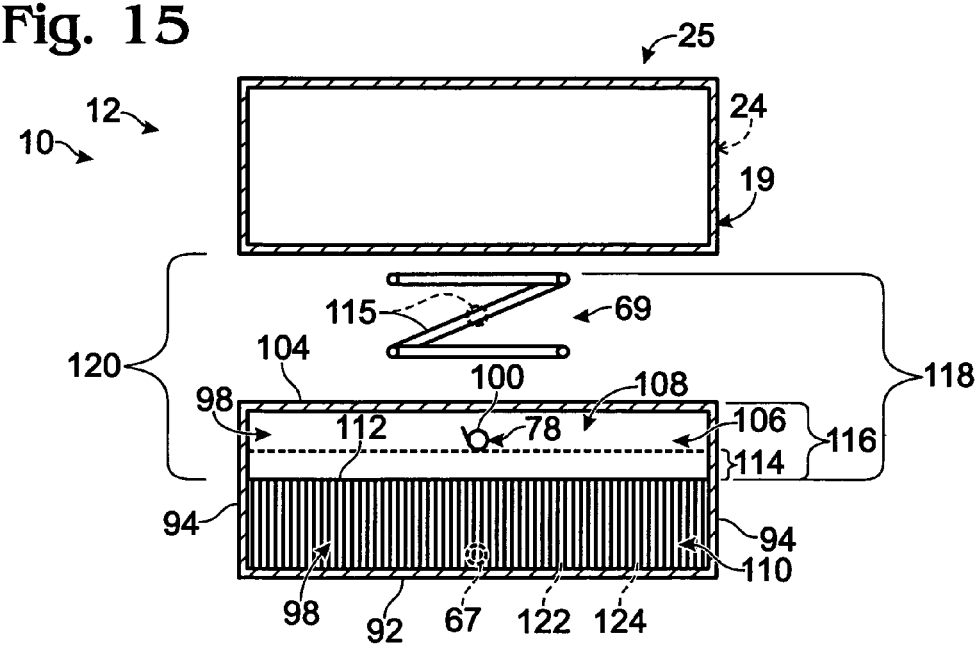
FIG. 15 is a partial cross-sectional view of the fuel processing assembly of FIG. 14 showing a heating assembly according to the present disclosure in cross-section.

As seen in FIG. 15, the top 112 of transport medium 110 may be spaced from heating and ignition source 78 by a first distance 114, from top member 104 by a second distance 116, from vaporization region 69 by a third distance 118, and from hydrogen-producing region 19 by a fourth distance 120. It is within the scope of the present disclosure that any or all of the distances 114, 116, 118, 120 and any other spacing between transport medium 110 and other components of fuel processing assembly 10 may be varied to obtain selected, or desired, thermal communication between the components. It is within the scope of the present disclosure that distance 114 may be zero, or nearly zero, or even that the heating and ignition source may extend at least partially into, or otherwise below the upper surface of, the transport medium, which may be described as corresponding to a negative first distance.

FIG. 15 illustrates in dashed lines an example of a vaporization region 69 that includes a tube, or conduit, 115 that makes a single pass beneath the hydrogen-producing assembly. Also shown in FIGS. 14 and 15 in dashed lines at 67 is an example of a distribution conduit that may extend within the fuel chamber to deliver the liquid fuel stream within the chamber. When the fuel chamber includes a transport medium 110, the medium may include a passage for the distribution conduit, may be formed or otherwise extend around the conduit, and/or may be positioned upon the conduit, etc.

Figure 16:
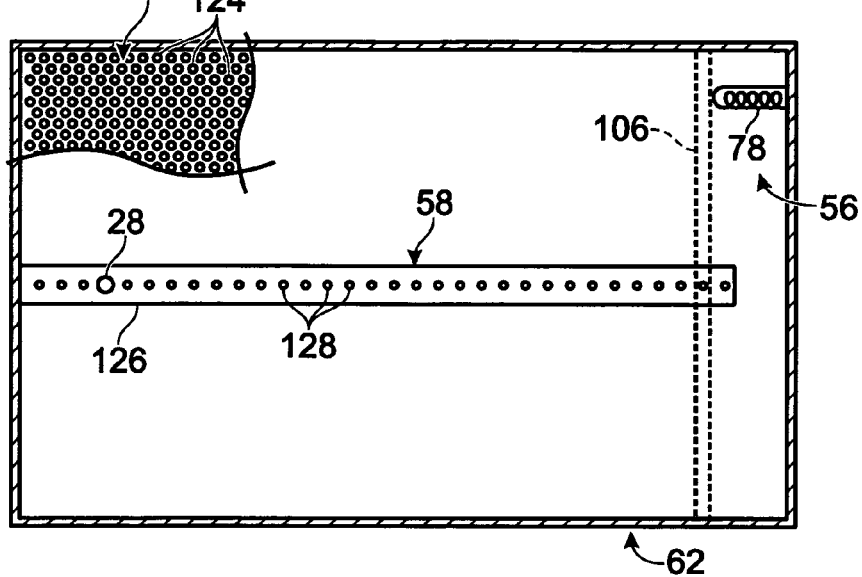
FIG. 16 is a cross-sectional view of another heating assembly according to the present disclosure and showing primary and start-up burner assemblies.

Turning now to FIG. 16, a cross sectional view of heating assembly 60 from FIG. 14 is illustrated showing the top view of the heating assembly, including start-up burner assembly 56. Also shown in FIG. 16 is a primary, or main, burner assembly 58. Primary burner assembly 58 is adapted to heat the hydrogen-producing region of the fuel processing assembly and/or vaporize the feed stream for this region during the hydrogen-producing operating state of the fuel processing assembly. As discussed, main burner assembly 58 may be disposed within heating assembly 60 in liquid fuel region 96, in the fuel vapor region 98, or partially in the liquid fuel region and partially in the fuel vapor region. In embodiments including transport medium 110 and a primary burner assembly 58, such as illustrated in FIGS. 14 and 16, primary burner assembly 58 may be disposed at least partially within the transport medium such that the upper surface of the primary burner assembly coincides, or is substantially coplanar with, the top 112 of transport medium 110. In some embodiments, primary burner assembly 58 may be configured as a burner tube 126 and may include one or more orifices and/or narrow slots for discharge and combustion of the gaseous fuel fed to the primary burner assembly 58. In FIG. 16, a plurality of orifices are indicated at 128. In this illustrative, non-exclusive example, a plurality of spaced-apart orifices 128 are shown, but other sizes, shapes, numbers and/or configuration of apertures may be used without departing from the scope of the present disclosure. Other configurations and shapes and other discharge and combustion methods are within the scope of the present disclosure.

Figure 17:
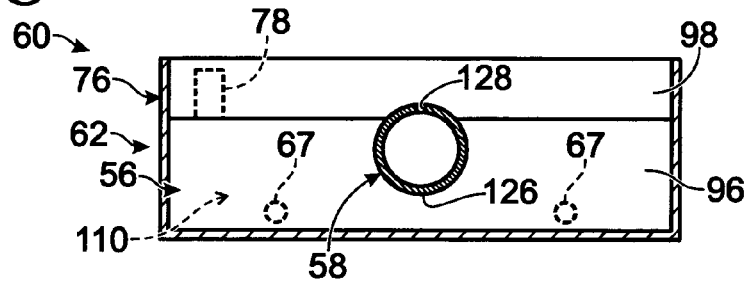
FIG. 17 is a cross-sectional view of another heating assembly according to the present disclosure.

FIG. 17 illustrates an example of a burner assembly 60 that includes both start-up and primary (or main) burner assemblies 56 and 58, with the primary burner assembly extending within the liquid fuel region 96 of the start-up burner assembly. As shown, the primary burner assembly takes the form of a burner tube, or conduit, 126 that is adapted to receive a gaseous fuel stream, which is exhausted through one or more orifices or other outlets 128 and ignited to generate a heated combustion stream for providing heat to at least the hydrogen-producing region of the fuel processing assembly during the hydrogen-producing operating state of the fuel processing assembly. As discussed, a suitable fuel stream for the primary burner assembly includes the byproduct stream 28 from a separation or purification region that removes impurities and/or undesirable components from the output, or mixed gas, stream 20 produced by the hydrogen-producing region. In some embodiments, another gaseous fuel is utilized as a combustible fuel for the primary burner assembly, either alone or in combination with byproduct stream 28.

FIG. 17 illustrates that it is within the scope of the present disclosure for the primary burner assembly to extend within the liquid fuel region of the start-up burner assembly. While this construction is not required, it enables the flames produced by the burner assemblies to extend at the same or similar heights. As discussed, the relative distances between the portions of the fuel processing assembly to be heated and the components of the heating assembly may vary within the scope of the present disclosure. In some embodiments, it may be desirable to have these components relatively closely together so as to not diminish or otherwise less efficiently utilize the heat value of the heated combustion stream. However, the geometry and construction of the fuel processing assembly may provide structural (i.e., space and size) constraints that impair this optional design objective. By recessing the primary burner assembly within the fuel region of the start-up burner assembly (for example, instead of locating it above the liquid fuel region of the start-up burner assembly), the thickness of the burner assembly, or perhaps more specifically the distances between the flames produced by the start-up and primary burner assemblies and the hydrogen-producing region, may be comparatively reduced. In the illustrated example shown in FIG. 17, the orifices 128 on the primary burner assembly are positioned above the liquid fuel region of the start-up burner assembly.

When the fuel chamber includes a transport medium and a primary burner assembly that extend within the liquid fuel region of the fuel chamber, the medium and burner assembly may be oriented in any suitable configuration within this region of the fuel chamber. As illustrative, non-exclusive examples, the transport medium may extend on opposed sides, and optionally beneath, the primary burner assembly, the primary burner assembly may be received within a recess or other passage in the transport medium, etc. FIG. 17 also provides a graphical example of a fuel chamber that includes more than one distribution conduit 67, with the conduits being illustrated in dashed lines to represent that the conduits are not required structure.

Figure 18:
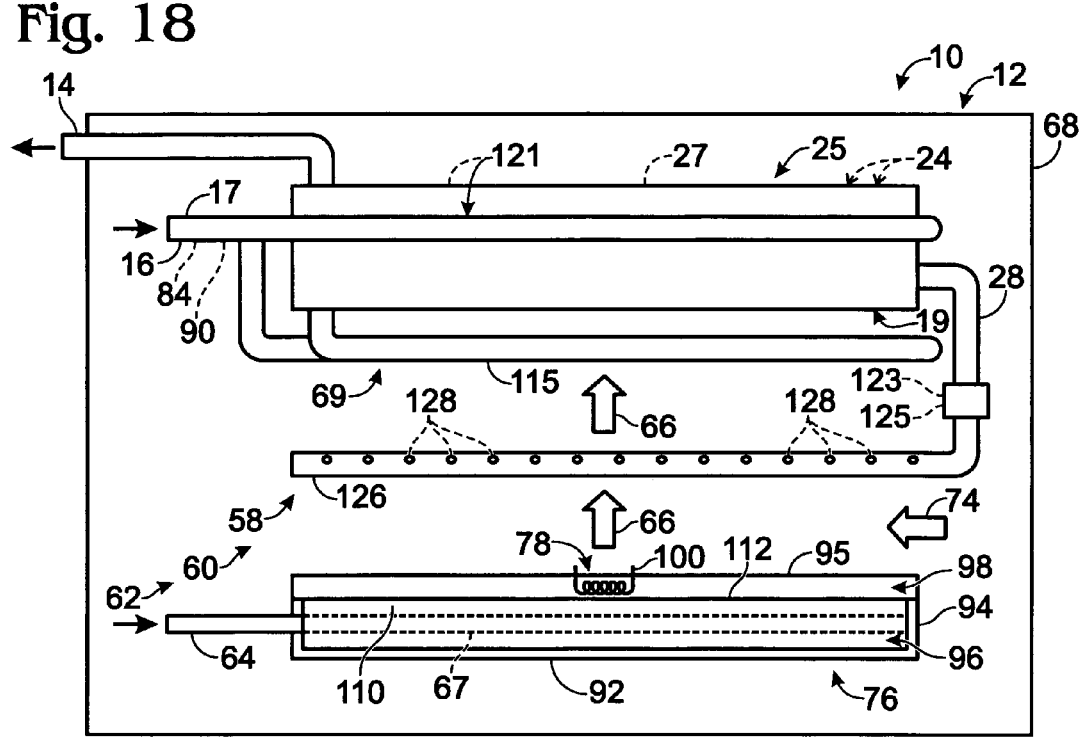
FIG. 18 is a side elevation view of another fuel processing assembly with a heating assembly according to the present disclosure.
Figure 19:
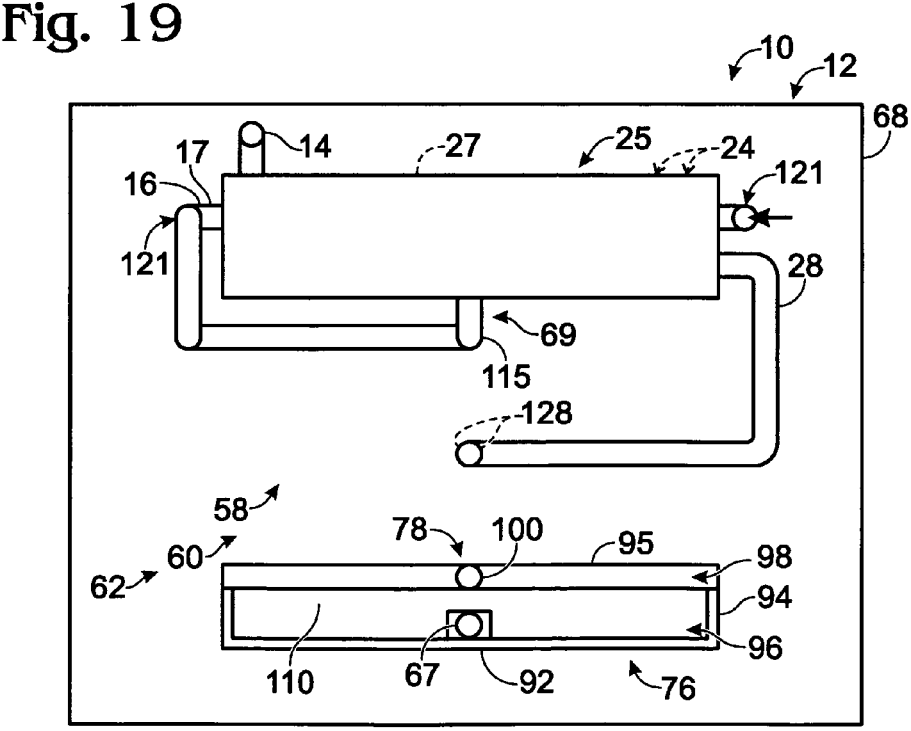
FIG. 19 is a partial cross-sectional end view of the fuel processing assembly of FIG. 18.

Another illustrative example of a fuel processing assembly 10 with a fuel processor 12 having a heating assembly 60 according to the present disclosure is shown in FIGS. 18 and 19. Unless otherwise discussed, the illustrated fuel processing assembly may include any of the components, subcomponents, and/or variants described, illustrated, and/or incorporated herein. Similarly, the newly described elements and/or configurations of FIGS. 18 and 19 may be utilized with any of the other fuel processing assemblies described, illustrated and/or incorporated herein. FIGS. 18 and 19 provide an example of a heating assembly 60 in which the primary burner assembly 58 is positioned above fuel chamber 76, which contains the start-up burner assembly 56. The illustrated primary burner assembly includes a transport medium 110 in the liquid fuel region 96 of the fuel chamber and further includes a distribution conduit 67 that is adapted to deliver the liquid fuel stream within the fuel chamber. Although not required, the illustrated conduit extends across at least a substantial portion of the fuel chamber and may include apertures to emit liquid fuel along the length of the conduit, and thereby along the length of the liquid fuel region. FIGS. 18 and 19 also provide a graphical example of a heating and ignition source 78 that includes a resistive element 100 positioned above a central region of the fuel chamber.

In the illustrated example, the primary burner assembly 58 includes an elongate conduit that extends at least generally parallel to the hydrogen-producing region and vaporization region of the fuel processor, with the primary burner assembly including apertures 128 through which a gaseous fuel stream is emitted and combusted from the primary burner assembly. In the illustrated example, primary burner assembly 58 is adapted to receive the byproduct stream 28 from assembly 25, which contains hydrogen-producing region 19 and at least one purification region 24. Although not required, assembly 25 may include a housing 27 that includes hydrogen-producing region 19, such as may include a stream or other reforming catalyst. Housing 27 may further contain at least one hydrogen-selective membrane and/or methanation catalyst that is adapted to separate the mixed gas stream produced in the hydrogen-producing region into product hydrogen stream 14 and byproduct stream 28. FIG. 18 also illustrates schematically that the conduit though which byproduct stream 28 flows prior to being consumed as a gaseous fuel for primary burner assembly 58 may (but is not required to) include at least one filter 123 and/or at least one restrictive orifice 125 that provides backpressure to the system and thereby promotes greater separation of hydrogen gas into the product hydrogen stream.

FIGS. 18 and 19 also illustrate that the fluid conduit that forms vaporization region 69 may include one or more preheating conduits 121 through which the liquid feed stream is heated prior to being vaporized in the vaporization region. Preheating of the liquid feed stream may reduce the length of the vaporization region and/or the time during which the feed stream needs to be in the vaporization region to be vaporized, and/or the amount of heat that is required to be delivered to the liquid feed stream in the vaporization region to vaporize the stream. Preheating of the liquid feed stream may also provide more stable, or steady flow of the stream, as some liquid streams may create a surging flow if the stream is quickly vaporized.

Figure 20:
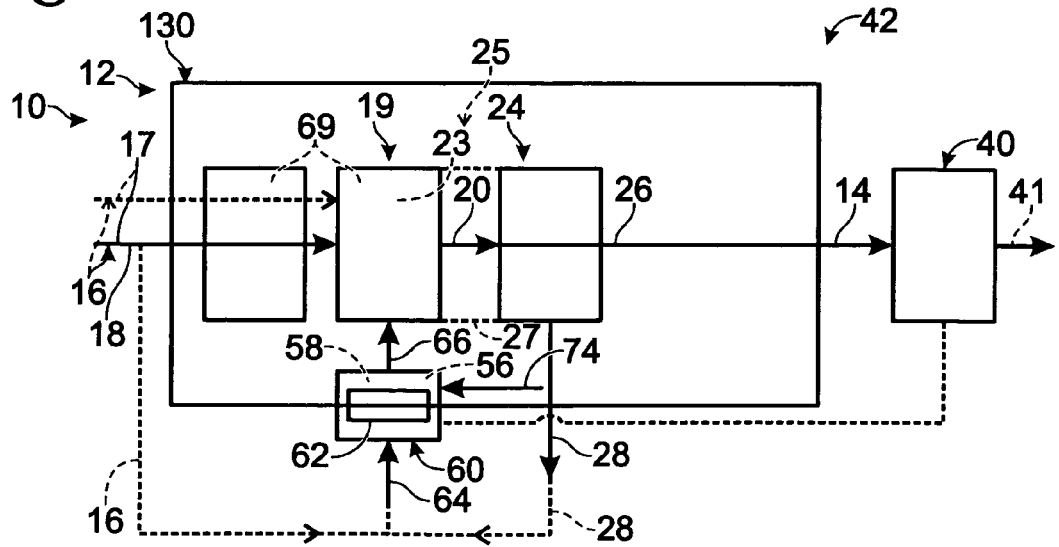
FIG. 20 is a schematic diagram of a steam reformer having a heating assembly according to the present disclosure and being in communication with a fuel cell stack.

Illustrative, non-exclusive methods of using the start-up, and optionally, main, burner assembly are described with respect to FIG. 20. FIG. 20 is a schematic view of a fuel processing assembly 10 that is coupled to a fuel cell stack 40. As discussed herein, heating assemblies 60 according to the present disclosure may be used to heat the hydrogen-producing regions of a variety of fuel processors. For purposes of illustration, the following discussion will describe a heating assembly according to the present disclosure being used with a fuel processor in the form of a steam reformer that is adapted to receive a feed stream 16 containing a carbon-containing feedstock and water. However, it is within the scope of the disclosure that fuel processor 12 may take other forms, including (but not limited to) other fuel processors that utilize an endothermic hydrogen-producing reaction, as discussed above. An example of a suitable steam reformer is schematically illustrated in FIG. 20 and indicated generally at 130. Reformer 130 includes at least one hydrogen-producing region 19 in the form of a reforming region that includes a steam reforming catalyst 23. In the reforming region, an output stream 20, which may in this context also be referred to as a reformate, or mixed gas, stream, is produced from the water and carbon-containing feedstock forming feed stream 16. As indicated in dashed lines in FIG. 20, reformer 130 may include a region 25 that includes both a hydrogen-producing region 19 and at least one purification region 24, such as may be contained in a common housing 27.

As discussed previously, feed stream 16 may be a single stream containing both water and a water-soluble carbon-containing feedstock, or it may be two or more streams that collectively contain the water and carbon-containing feedstock(s) that are consumed in the reforming region. As shown in dashed lines in FIG. 20, it is within the scope of the disclosure that at least the carbon-containing feedstock component of feed stream 16 may also form a combustible fuel stream 64 that is delivered to heating assembly 60. It is also within the scope of the disclosure that the complete feed stream (i.e. water and carbon-containing feedstock) may be used as the combustible fuel stream for heating assembly 60. For example, a reforming feed stream may contain approximately 50-75 vol % methanol (or ethanol or another suitable water-miscible carbon-containing), and approximately 25-50 vol % water. An example of a particularly well-suited feed stream contains 69 vol % methanol and 31 vol % water. This stream may effectively be used as the feed stream for reformer 130 and the combustible fuel stream for a heating assembly according to the present disclosure. A benefit of such a construction is that a steam reformer or other fuel processor that produces hydrogen gas from water and a carbon-containing feedstock does not need to include more than a single supply, if the water and water-soluble liquid carbon-containing feedstock are premixed. If not, then the fuel processing assembly still only requires a water supply and a carbon-containing feedstock supply. In contrast, conventional steam reformers with burner assemblies to heat the reformer require a fuel supply and associated delivery and monitoring systems for the burner assembly, and this fuel supply is independent from the fuel supply for the steam reformer.

As an illustrative example, startup of a fuel processor 12 in the form of a steam reformer is discussed with reference to FIG. 20. During startup of a steam reformer or other fuel processor with heating assembly 60, at least a portion (if not all) of feed stream 16 is delivered to the heating assembly as liquid fuel stream 64 and thereafter ignited and combusted with air stream 74, or ambient air, to produce a heated combustion stream 66 that is used to heat the steam reformer. In some embodiments, a pump, such as a positive displacement pump, may be used and adapted to provide a predetermined volume of liquid fuel stream 64, which may also be described as a predetermined quantity of liquid, carbon-containing feedstock, to the fuel chamber of heating assembly 60. As discussed, the liquid fuel stream is delivered to the fuel chamber and retained therein as a liquid supply of fuel that is consumed during at least startup of the fuel processing assembly. Therefore, unlike a heating assembly that consumes the fuel stream as it is delivered thereto, the start-up burner assembly 56 of the present disclosure at least temporarily stores a volume of liquid fuel. In some embodiments, fuel stream 64 may be configured to provide a stream of carbon-containing feedstock during at least the start up phase and, optionally, during the (hydrogen-producing) operating state of the fuel processor.

The fuel stream 64 is delivered to the fuel chamber and is heated by the heating and ignition source to increase the vapor pressure of the carbon-containing fuel in the fuel vapor region of the start up burner assembly. The fuel vapor is ignited by the heating and ignition source 78 and the combustion of the fuel begins. The heat of combustion adjacent the ignition source will radiate and heat the adjacent liquid fuel to further increase the vapor pressure of the carbon-containing fuel in the fuel chamber, allowing the flame and combustion to propagate throughout the fuel chamber. The temperature at which the fuel vapor ignites is determined by a number of factors, as discussed above. When the temperature in the fuel chamber adjacent the heating and ignition source reaches the ignition temperature, the fuel vapor is ignitable. In some embodiments, the fuel vapor ignites, or is ignited, upon being heated to the ignition temperature. In other embodiments, the fuel vapor only ignites when the surface temperature of the heating and ignition source reaches the heating element ignition temperature, or the temperature at which the surface of the heating element is sufficiently hot to ignite the fuel vapor (such as glowing hot or red hot).

Because the combustion can propagate through the fuel chamber 76, heating and ignition source 78 can be significantly smaller than the size of the fuel chamber. For example, the heating and ignition source may be a localized heat source. A localized heat source is a heating element that is substantially smaller than the fuel chamber. The liquid fuel disposed in the fuel chamber has a top surface having a surface area. The localized heat source may be coiled, linear, or otherwise configured as described above and may be disposed above, or partially above, the top surface of the liquid fuel. The localized heat source may have a footprint (i.e., occupy a space) corresponding to the surface area of liquid fuel corresponding or aligned with the localized heat source. The footprint of the localized heat source may be substantially smaller than the surface area of the liquid fuel in the fuel chamber. For example, the footprint may correspond to only 20% of the surface area of the liquid fuel region. In other embodiments, the heating and ignition source may be sized to have a footprint corresponding to only 10%, 5%, or smaller amounts of the surface area. It is within the scope of the present disclosure that the heating and ignition source be larger, or correspond with a larger percentage of the liquid fuel surface area, and that the heating and ignition source may be still smaller. The size of heating and ignition source 78 and the configuration of fuel chamber 76 (i.e., whether there are baffles, top members, disposition of the heating and ignition source, etc.) may affect the ignition temperature of the carbon-containing fuel and may also affect the heating element ignition temperature. Moreover, the size and location of the ignition region and combustion region will be determined by the configuration of the heating and ignition source, as described above.

Once combustion is initiated in the start-up burner assembly 56, the combustion continues, in some cases aided by the transport medium, at least until the reformer or other hydrogen-producing region 19 is heated to a selected, or predetermined, temperature. In embodiments utilizing a metered pump to dispense a predetermined amount of carbon-containing feedstock into the fuel chamber, the amount of fuel dispensed may be calculated to contain at least enough carbon-containing feedstock to raise the temperature of the hydrogen-producing region 19 to the predetermined temperature. In some embodiments, the predetermined temperature to which the start-up burner assembly is adapted to heat the reformer is greater or less than the operating temperature of the hydrogen-producing region. For example, the selected, or predetermined, temperature to which the start-up burner assembly raises the reformer may be a certain amount above or below the desired operating, or reforming, temperature, such as 25-125° C., 25-75° C., 50-100° C., etc., less than or greater than the reforming temperature.

In embodiments utilizing a metered pump that delivers a predetermined quantity of fuel to the start-up burner assembly, the start-up burner assembly 56 may be configured to combust the fuel until all the fuel is combusted, at which point the primary burner assembly 58 may be operated to maintain the operating temperature of the fuel processing assembly. In exothermic fuel processing assemblies, the start-up burner assembly may be operated to raise the fuel processing assembly to the predetermined temperature, sufficient to begin operating the hydrogen-producing mechanism, and/or to vaporize or otherwise preheat the feed stream(s) for the fuel processor. At this point, the exothermic reaction of the hydrogen-producing region may be used to maintain the operating temperature of the hydrogen-producing region.

In embodiments not utilizing a metered pump to dispense the carbon-containing fuel stream to fuel chamber 76, fuel stream 64 may be delivered to start-up burner assembly 56 until the hydrogen-producing region is heated to a predetermined temperature. In this embodiment, the predetermined temperature may be still lower than the temperature discussed above (i.e., there may be a greater difference between the predetermined temperature and the reforming temperature). One reason for this is that the fuel chamber may contain a certain amount of liquid fuel that is yet uncombusted when the fuel stream stops flowing to the start-up burner assembly, which liquid fuel will be combusted to further raise the temperature of the fuel processing assembly 10 even after fuel stream 64 stops flowing to start-up burner assembly 56.

As compared to the embodiment with the metered pump, an embodiment with a continual flow of fuel to the start-up burner assembly may have at least one additional feature, such as a temperature- or time-based flow controller and/or a liquid fuel, ignition chamber separator. The temperature- or time-based flow controller may be adapted to automatically stop, either abruptly or gradually, the flow of fuel stream 64 to the start-up burner assembly 56 when the predetermined temperature is reached, such as by measuring the temperature directly or by measuring the time and comparing it to empirical temperature/time tables. It is within the scope of the present disclosure that the flow of fuel stream 64 may also be controlled manually in some embodiments. Additionally, start-up burner assembly 56 may include a liquid fuel ignition chamber separator to prevent newly added fuel and carbon-containing feedstock from cooling the liquid fuel already being heated by the heating and ignition source.

Also within the scope of the present disclosure are start-up heating assemblies that utilize a metered pump to provide an initial quantity of liquid fuel to be heated and ignited and then a continuous feed of fuel stream 64 after ignition and combustion has begun, to ensure continued combustion until the predetermined temperature is obtained.

Whether a metered pump and predetermined volume is utilized, a continuous feed of fuel stream 64 is utilized, or some combination of the two, upon heating the hydrogen-producing region to the predetermined temperature at which feed stream 16 can be delivered to the hydrogen-producing region 19, the feed stream may be directed to the reforming region and hydrogen production may begin. In embodiments where a common stream, such as composite stream 90 is used as both feed stream 16 and fuel stream 64, the transition between supplying fuel stream 64 and supplying feed stream 16 may be instantaneous, gradual, or there may be a break between supplying fuel stream 64 and supplying feed stream 16, such as when a metered pump is used to deliver a predetermined quantity of fuel to heating assembly 60.

As hydrogen gas is produced in the reforming region of the steam reformer, and then purified in one or more purification regions 24, a gaseous byproduct stream 28 may be produced and may be delivered to the heating assembly to be used as a fuel stream by the primary burner assembly 58. FIG. 20 illustrates the byproduct stream being directed to heating assembly 60, as described. In some applications, such as most steam reformers in which the carbon-containing feedstock is methanol, the byproduct stream should have sufficient heating value that heating assembly 60 will not require any additional liquid fuel, such as additional carbon-containing feedstock from feed stream 16. However, when other carbon-containing feedstocks, and especially hydrocarbons, are used, it may be necessary either to continue to supply the primary burner assembly with carbon-containing feedstock, such as from feed stream 16 or another source, and/or to use some of the product hydrogen stream as a fuel stream in order to provide sufficient fuel to maintain the temperature of the reformer.

Illustrative, non-exclusive, examples of descriptions of some heating assemblies and/or fuel processing assemblies within the scope of the present disclosure are presented in the following numbered paragraphs. The following paragraphs are not intended to be an exhaustive set of descriptions, and are not intended to define minimum or maximum scopes or required elements of the present disclosure. Instead, they are provided as illustrative examples of some heating assemblies and/or fuel processing assemblies, with other descriptions of broader or narrower scopes still being within the scope of the present disclosure.

1. A fuel processing assembly, comprising:
  a reforming region adapted to receive at least one feed stream comprising a carbon-containing feedstock and to produce an output stream comprising hydrogen gas as a majority component; and
  a heating assembly in thermal communication with the reforming region, wherein the heating assembly comprises at least one fuel chamber and at least one heating and ignition source;
  wherein the at least one fuel chamber is adapted to receive at least one fuel stream at a first temperature, the at least one fuel stream comprising a liquid, combustible, carbon-containing fuel having an ignition temperature greater than said first temperature; and
  wherein the at least one heating and ignition source is adapted to heat at least a portion of the fuel chamber to raise the temperature of at least a portion of the carbon-containing fuel to a second temperature at least as great as the ignition temperature and to ignite the carbon-containing fuel.

2. The fuel processing assembly of paragraph 1, wherein the feed stream and the fuel stream each comprise at least one common carbon-containing component.

3. The fuel processing assembly of paragraph 1 or paragraph 2, wherein the feed stream and the fuel stream each comprise at least 25 vol % water and at least one water-miscible carbon-containing component.

4. The fuel processing assembly of paragraph 3, wherein the feed at least water-miscible carbon-containing component includes methanol.

5. The fuel processing assembly of paragraph 3, wherein the feed at least water-miscible carbon-containing component includes ethanol.

6. The fuel processing assembly of any preceding paragraph, wherein at least a portion of the heating assembly is disposed adjacent to the reforming region.

7. The fuel processing assembly of any preceding paragraph, wherein the heating and ignition source comprises an electrical resistance heating element adapted to be heated to a heating element ignition temperature at which the heating element is adapted to ignite the carbon-containing fuel in the chamber.

8. The fuel processing assembly of paragraph 7, wherein the electrical resistance heating element includes a localized heat source.

9. The fuel processing assembly of any preceding paragraph, wherein the fuel chamber includes an at least substantially open reservoir.

10. The fuel processing assembly of any preceding paragraph, wherein the heating assembly further comprises a transport medium disposed in the fuel chamber.

11. The fuel processing assembly of paragraph 10, wherein the transport medium is adapted to at least temporarily absorb the liquid combustible carbon-containing fuel.

12. The fuel processing assembly of paragraph 10 or 11, wherein the transport medium is adapted to define a flame-holding surface for the fuel.

13. The fuel processing assembly of paragraph 12, wherein the transport medium is adapted to draw liquid combustible carbon-containing fuel from a liquid fuel region of the fuel chamber to the flame-holding surface.

14. The fuel processing assembly of any preceding paragraph, wherein the fuel chamber includes a liquid fuel region and a fuel vapor region, and wherein at least a portion of the heating and ignition source is disposed in the fuel vapor region.

15. The fuel processing assembly of paragraph 14, wherein the heating and ignition source is disposed above the liquid fuel region and between the liquid fuel region and the reforming region.

16. The fuel processing assembly of any preceding paragraph, wherein the fuel chamber is adapted to receive a predetermined volume of combustible carbon-containing fuel.

17. The fuel processing assembly of paragraph 16, wherein the predetermined volume of combustible carbon-containing fuel comprises at least enough fuel to heat the reforming region to a predetermined temperature.

18. A fuel processing assembly, comprising:
  a reforming region adapted to receive at least one feed stream comprising a carbon-containing feedstock and to produce an output stream comprising hydrogen gas as a majority component; and
  a heating assembly adapted to heat the reforming region; wherein the heating assembly comprises at least one fuel chamber and at least one heating and ignition source; wherein the at least one fuel chamber includes a liquid fuel region and a fuel vapor region;
  wherein the at least one fuel chamber is adapted to receive at least one fuel stream comprising a liquid, combustible, carbon-containing fuel having an ignition partial pressure; wherein the carbon-containing fuel in the chamber has an initial partial pressure that is less than its ignition partial pressure; and
  wherein the at least one heating and ignition source is adapted to heat at least a portion of the fuel chamber to raise the partial pressure of the carbon-containing fuel in at least a portion of the fuel vapor region of the fuel chamber to a second partial pressure at least as great as the ignition partial pressure and to ignite the fuel.

19. The fuel processing assembly of paragraph 18, wherein the feed stream and the fuel stream each comprise at least one common carbon-containing component.

20. The fuel processing assembly of paragraph 18 or paragraph 19, wherein the feed stream and the fuel stream each comprise at least 25 vol % water and at least one water-miscible carbon-containing component.

21. The fuel processing assembly of paragraph 20, wherein the feed at least water-miscible carbon-containing component includes methanol.

22. The fuel processing assembly of paragraph 20, wherein the feed at least water-miscible carbon-containing component includes ethanol.

23. The fuel processing assembly of any one of paragraphs 18-22, wherein the at least one heating and ignition source comprises an electrical resistance heating element adapted to be heated to a heating element ignition temperature at which the heating element is adapted to ignite the carbon-containing fuel in the chamber.

24. The fuel processing assembly of paragraph 23, wherein the electrical resistance heating element includes a localized heat source.

25. The fuel processing assembly of any one of paragraphs 15-24, wherein the fuel chamber includes an at least substantially open reservoir.

26. The fuel processing assembly of any one of paragraphs 18-25, wherein the heating assembly further comprises a transport medium disposed in the fuel chamber.

27. The fuel processing assembly of paragraph 26, wherein the transport medium is adapted to at least temporarily absorb the liquid combustible carbon-containing fuel.

28. The fuel processing assembly of paragraph 26 or 27, wherein the transport medium is adapted to define a flame-holding surface for the fuel.

29. The fuel processing assembly of paragraph 28, wherein the transport medium is adapted to draw liquid combustible carbon-containing fuel from a liquid fuel region of the fuel chamber to the flame-holding surface.

30. The fuel processing assembly of any one of paragraphs 18-29, wherein at least a portion of the heating and ignition source is disposed in the fuel vapor region.

31. The fuel processing assembly of any one of paragraphs 30, wherein the heating and ignition source is disposed above the liquid fuel region and between the liquid fuel region and the reforming region.

32. The fuel processing assembly of any one of paragraphs 18-31, wherein the fuel chamber is adapted to receive a predetermined volume of combustible carbon-containing fuel.

33. The fuel processing assembly of paragraph 32, wherein the predetermined volume of combustible carbon-containing fuel comprises at least enough combustible carbon-containing fuel to heat the reforming region to a predetermined temperature.

34. In a fuel processing assembly having a reforming region having a minimum hydrogen-production temperature and adapted to receive at least one feed stream comprising at least a carbon-containing feedstock and to produce an output stream comprising hydrogen gas as a majority component, a method of starting up the fuel processing assembly, the method comprising:

delivering at least one fuel stream comprising a liquid, combustible, carbon-containing fuel to a heating assembly at a first temperature, wherein the carbon-containing fuel has an ignition temperature greater than the first temperature;

heating said fuel stream in the heating assembly with at least one heating and ignition source to a second temperature at least as great as the ignition temperature;

igniting said fuel stream in the heating assembly with the at least one heating and ignition source to produce a hot combustion stream;

heating the reforming region of the fuel processing assembly with the hot combustion stream to a predetermined temperature related to the minimum hydrogen-production temperature of the reforming region; and delivering the feed stream containing at least a carbon-containing feedstock to the reforming region to produce the output stream.

35. The method of paragraph 34, wherein the feed stream and the fuel stream each comprise at least one common carbon-containing component delivered from a common supply source.

36. The method of paragraph 34 or paragraph 35, wherein the feed stream and the fuel stream each comprise at least 25 vol % water and at least one water-miscible carbon-containing component.

37 The method of paragraph 36, wherein the feed at least water-miscible carbon-containing component includes methanol.

38. The method of paragraph 36, wherein the feed at least water-miscible carbon-containing component includes ethanol.

39. The method of any one of paragraphs 34-38, wherein the at least one heating and ignition source comprises an electrical resistance heating element; and wherein igniting the fuel stream in the heating assembly includes heating the electrical resistance heating element to a heating element ignition temperature at which the heating element is adapted to ignite the carbon-containing fuel in the heating assembly.

40. The method of any one of paragraphs 34-39, wherein the heating assembly includes a fuel chamber having a liquid fuel region and a fuel vapor region, wherein the carbon-containing fuel delivered to the fuel chamber has a first partial pressure, and wherein the carbon-containing fuel has an ignition partial pressure greater than the first partial pressure, wherein heating the fuel stream in the heating assembly includes heating at least a portion of the carbon-containing fuel in the liquid fuel region to increase at least one of the temperature and the partial pressure of the carbon-containing fuel in at least a portion of the fuel vapor region to a second temperature and a second partial pressure at least as great as the ignition temperature or ignition partial pressure.

41. The method of any one of paragraphs 34-40, wherein delivering a fuel stream to the heating assembly includes delivering a predetermined volume of combustible carbon-containing fuel.

42. The method of any one of paragraphs 34-41, wherein the heating assembly includes a fuel chamber having a liquid fuel region and a fuel vapor region; wherein a transport medium is disposed at least in the liquid fuel region; wherein igniting the fuel stream in the heating assembly includes creating a flame at an interface between the liquid fuel region and the fuel vapor region; and wherein heating the reforming region with the heated stream includes wicking the liquid carbon-containing fuel through the transport medium to the interface between the liquid fuel region and the fuel vapor region.

43. The use of any of the fuel processing assemblies of paragraphs 1-42.

INDUSTRIAL APPLICABILITY

Heating assemblies, steam reformers, fuel processing assemblies, and fuel cell systems according to the present disclosure are applicable to the fuel processing, fuel cell and other industries in which hydrogen gas is produced, and in the case of fuel cell systems, consumed by a fuel cell stack to produce an electric current.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A fuel processing assembly, comprising:
   a reforming region adapted to receive at least one feed stream comprising a carbon-containing feedstock and to produce therefrom a mixed gas stream comprising hydrogen gas as a majority component; and
   a heating assembly in thermal communication with the reforming region, wherein the heating assembly comprises:
      at least one fuel chamber that includes an at least substantially open top and is adapted to receive at least one liquid fuel stream at a first temperature, the at least one liquid fuel stream comprising a liquid, combustible, carbon-containing fuel having an ignition temperature greater than said first temperature, wherein the at least one fuel chamber is further adapted to retain the liquid, combustible, carbon-containing fuel therein during combustion thereof; and
      at least one heating and ignition source positioned to ignite fuel vapor formed from and above the liquid, combustible, carbon-containing fuel that is retained in the at least one fuel chamber;
   wherein the at least one heating and ignition source is adapted to heat at least a portion of the fuel chamber to raise the temperature of at least a portion of the fuel vapor formed from and above the liquid, combustible, carbon-containing fuel that is retained in the at least one fuel chamber to a second temperature at least as great as the ignition temperature and to ignite the fuel vapor formed from and above the liquid, combustible, carbon-containing fuel that is retained in the at least one fuel chamber.

2. The fuel processing assembly of claim 1, wherein the feed stream and the at least one liquid fuel stream each comprise at least one common carbon-containing component.

3. The fuel processing assembly of claim 1, wherein the feed stream and the at least one liquid fuel stream each comprise at least 25 vol % water and at least one water-miscible carbon-containing component.

4. The fuel processing assembly of claim 3, wherein the at least one water-miscible carbon-containing component includes methanol.

5. The fuel processing assembly of claim 3, wherein the at least one water-miscible carbon-containing component includes ethanol.

6. The fuel processing assembly of claim 1, wherein the heating and ignition source comprises an electrical resistance heating element adapted to be heated to a heating element ignition temperature at which the heating element is adapted to ignite the fuel vapor formed from and above the liquid, combustible, carbon-containing fuel that is retained in the at least one fuel chamber.

7. The fuel processing assembly of claim 6, wherein the electrical resistance heating element includes a localized heat source.

8. The fuel processing assembly of claim 1, wherein the heating assembly further comprises a transport medium disposed in the fuel chamber.

9. The fuel processing assembly of claim 8, wherein the transport medium is adapted to at least temporarily absorb the liquid, combustible, carbon-containing fuel that is retained in the at least one fuel chamber.

10. The fuel processing assembly of claim 8, wherein the transport medium is adapted to define a flame-holding surface for the liquid, combustible, carbon-containing fuel that is retained in the at least one fuel chamber.

11. The fuel processing assembly of claim 1, wherein the at least one fuel chamber includes a liquid fuel region and a fuel vapor region, and wherein at least a portion of the heating and ignition source is disposed in the fuel vapor region.

12. The fuel processing assembly of claim 11, wherein the heating and ignition source is disposed above the liquid fuel region and between the liquid fuel region and the reforming region.

13. The fuel processing assembly of claim 1, wherein the at least one fuel chamber is adapted to receive a predetermined volume of the liquid, combustible, carbon-containing fuel.

14. The fuel processing assembly of claim 13, wherein the predetermined volume of the liquid, combustible, carbon-containing fuel comprises at least enough fuel to heat the reforming region to a predetermined temperature but not enough fuel to maintain the reforming region at the predetermined temperature while the reforming region is producing the mixed gas stream.

15. A fuel processing assembly, comprising:
   a reforming region adapted to receive at least one feed stream comprising a carbon-containing feedstock and to produce an output stream comprising hydrogen gas as a majority component; and
   a heating assembly adapted to heat the reforming region; wherein the heating assembly comprises:
      at least one fuel chamber that includes an at least substantially open top and is adapted to receive at least one liquid fuel stream comprising a liquid, combustible, carbon-containing fuel having an ignition partial pressure that is greater than an initial partial pressure of fuel vapor formed from and above the liquid, combustible, carbon-containing fuel that is initially received in the at least one fuel chamber, wherein the at least one fuel chamber is further adapted to retain the liquid, combustible, carbon-containing fuel therein during combustion thereof; and
      at least one heating and ignition source positioned to ignite the fuel vapor formed from and above the liquid, combustible, carbon-containing fuel that is retained in the at least one fuel chamber;
   wherein the at least one heating and ignition source is adapted to heat at least a portion of the at least one fuel chamber to raise the partial pressure of the fuel vapor formed from and above the liquid, combustible, carbon-containing fuel that is retained in the at least one fuel chamber to a second partial pressure at least as great as the ignition partial pressure and to ignite the fuel vapor formed from and above the liquid, combustible, carbon-containing fuel that is retained in the at least one fuel chamber.

16. The fuel processing assembly of claim 15, wherein the feed stream and the at least one liquid fuel stream each comprise at least one common carbon-containing component.

17. The fuel processing assembly of claim 16, wherein the feed stream and the at least one liquid fuel stream each comprise at least 25 vol % water and at least one water-miscible carbon-containing component.

18. The fuel processing assembly of claim 17, wherein the at least one water-miscible carbon-containing component includes methanol.

19. The fuel processing assembly of claim 17, wherein the at least one water-miscible carbon-containing component includes ethanol.

20. The fuel processing assembly of claim 18, wherein the at least one heating and ignition source comprises an electrical resistance heating element adapted to be heated to a heating element ignition temperature at which the heating element is adapted to ignite the fuel vapor formed above and from the liquid, combustible, carbon-containing fuel that is retained in the at least one fuel chamber.

21. The fuel processing assembly of claim 15, wherein the heating assembly further comprises a transport medium disposed in the at least one fuel chamber.

22. The fuel processing assembly of claim 15, wherein the at least one fuel chamber includes a liquid fuel region and a fuel vapor region, and wherein at least a portion of the heating and ignition source is disposed in the fuel vapor region.

23. The fuel processing assembly of claim 22, wherein the heating and ignition source is disposed above the liquid fuel region and between the liquid fuel region and the reforming region.

24. The fuel processing assembly of claim 15, wherein the at least one fuel chamber is adapted to receive a predetermined volume of liquid, combustible, carbon-containing fuel.

25. The fuel processing assembly of claim 24, wherein the predetermined volume of liquid, combustible, carbon-containing fuel comprises at least enough fuel to heat the reforming region to a predetermined temperature, but not enough fuel to maintain the reforming region at the predetermined temperature while the reforming region is producing the output stream.

26. The fuel processing assembly of claim 1, wherein the at least one fuel chamber includes an ignition region separated from a combustion region, wherein the at least one heating and ignition source is disposed in the ignition region and is adapted to directly heat the ignition region to raise the temperature of the at least a portion of the fuel vapor formed from and above the liquid, combustible, carbon-containing fuel that is retained in the at least one fuel chamber to the second temperature and to ignite the fuel vapor in the ignition region so combustion thereof propagates to and across the combustion region.

27. The fuel processing assembly of claim 26, wherein the at least one fuel chamber includes an at least partially enclosed ignition chamber defining the ignition region.

28. The fuel processing assembly of claim 15, wherein the at least one fuel chamber includes an ignition region separated from a combustion region, wherein the at least one heating and ignition source is disposed in the ignition region and is adapted to directly heat the ignition region to raise the partial pressure of the fuel vapor formed from and above the liquid, combustible, carbon-containing fuel that is retained in the at least one fuel chamber in the ignition region to the second partial pressure and to ignite the fuel vapor in the ignition region so combustion thereof propagates to and across the combustion region.

29. The fuel processing assembly of claim 28, wherein the at least one fuel chamber includes an at least partially enclosed ignition chamber defining the ignition region.

30. A fuel processing assembly, comprising:
   a reforming region adapted to receive at least one feed stream comprising a carbon-containing feedstock and to produce therefrom a mixed gas stream comprising hydrogen gas as a majority component; and
   a heating assembly in thermal communication with the reforming region, wherein the heating assembly includes:
      means for receiving and retaining liquid fuel, wherein the liquid fuel is received at a first temperature and has an ignition temperature greater than the first temperature, wherein the means for receiving and retaining includes a chamber with an at least substantially open top;
      means for heating at least a portion of the means for receiving and retaining to raise the temperature of at least a portion of fuel vapor formed from and above the liquid fuel that is retained in the means for receiving and retaining to at least the ignition temperature; and
      means for igniting the at least a portion of the fuel vapor formed from and above the liquid fuel that is retained in the means for receiving and retaining.

31. The fuel processing assembly of claim 30, wherein the means for receiving and retaining is means for receiving and retaining a predetermined volume of liquid fuel that includes at least enough fuel to heat the reforming region to at least a reforming temperature but not enough fuel to maintain the reforming region at or above the reforming temperature while the reforming region is producing the mixed gas stream.

* * * * *

UNITED STATES PATENT AND TRADEMARK OFFICE
CERTIFICATE OF CORRECTION

PATENT NO.        : 7,632,322 B2                                          Page 1 of 1
APPLICATION NO. : 11/226810
DATED             : December 15, 2009
INVENTOR(S)       : David J. Edlund It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 410 days.

Signed and Sealed this

Second Day of November, 2010

David J. Kappos
*Director of the United States Patent and Trademark Office*